May 6, 1958  A. M. ALEXANDRESCU  2,833,159
AUTOMATIC HYDRAULICALLY OPERATED TRANSMISSION
Filed July 21, 1954  12 Sheets-Sheet 1
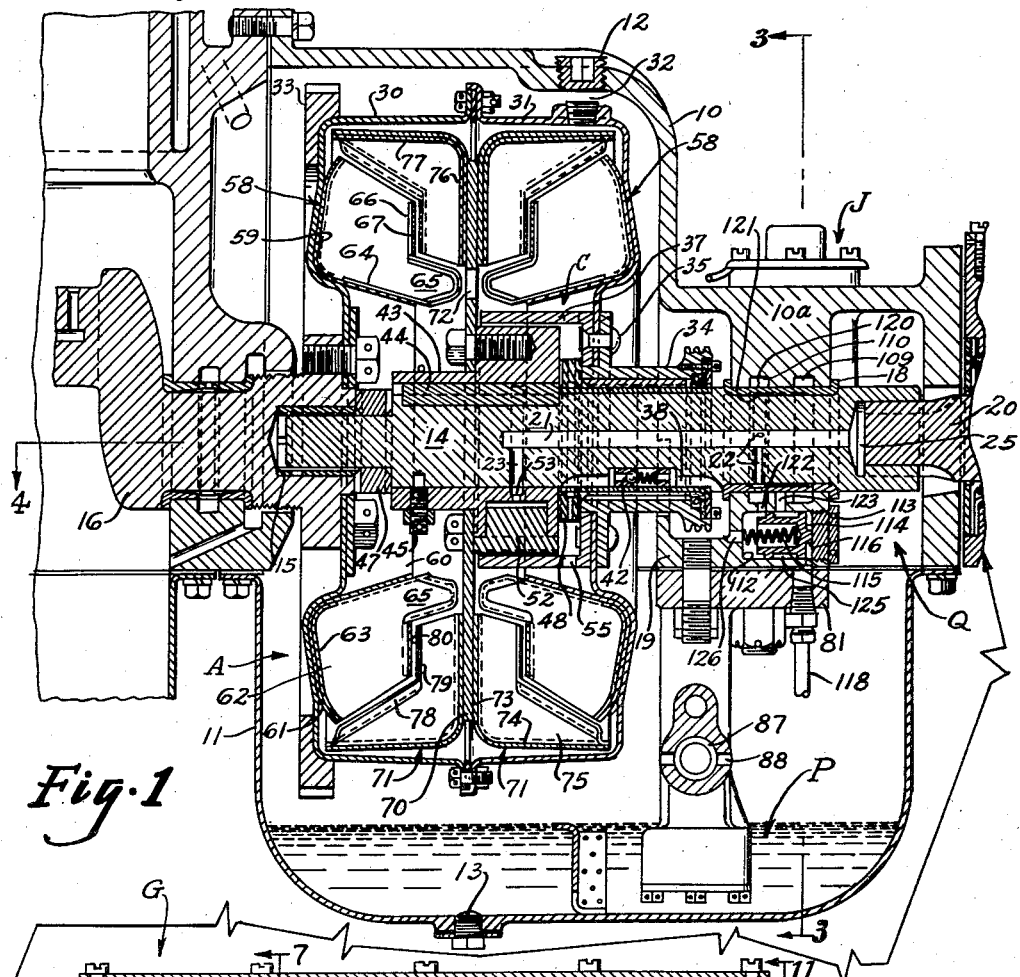
Fig. 1
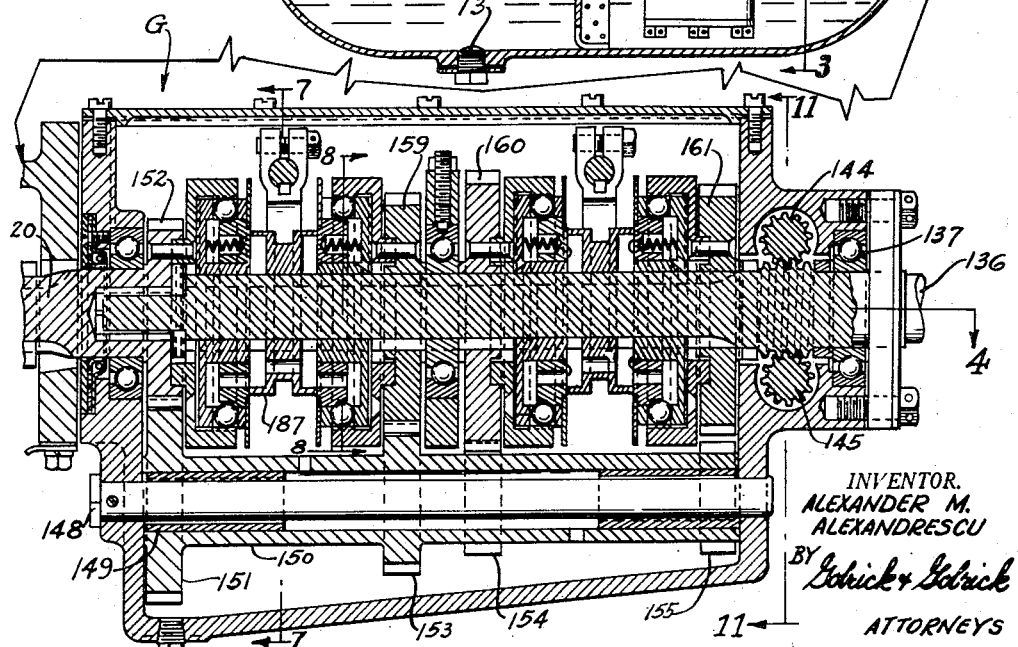
INVENTOR.
ALEXANDER M.
ALEXANDRESCU
BY Gdrick & Gdrick
ATTORNEYS May 6, 1958 A. M. ALEXANDRESCU 2,833,159
AUTOMATIC HYDRAULICALLY OPERATED TRANSMISSION
Filed July 21, 1954 12 Sheets-Sheet 2

INVENTOR.
ALEXANDER M. ALEXANDRESCU
BY Gobrick & Gobrick
ATTORNEYS

May 6, 1958   A. M. ALEXANDRESCU   2,833,159
AUTOMATIC HYDRAULICALLY OPERATED TRANSMISSION
Filed July 21, 1954   12 Sheets-Sheet 3

INVENTOR.
ALEXANDER M. ALEXANDRESCU
BY Golrick & Golrick
ATTORNEYS

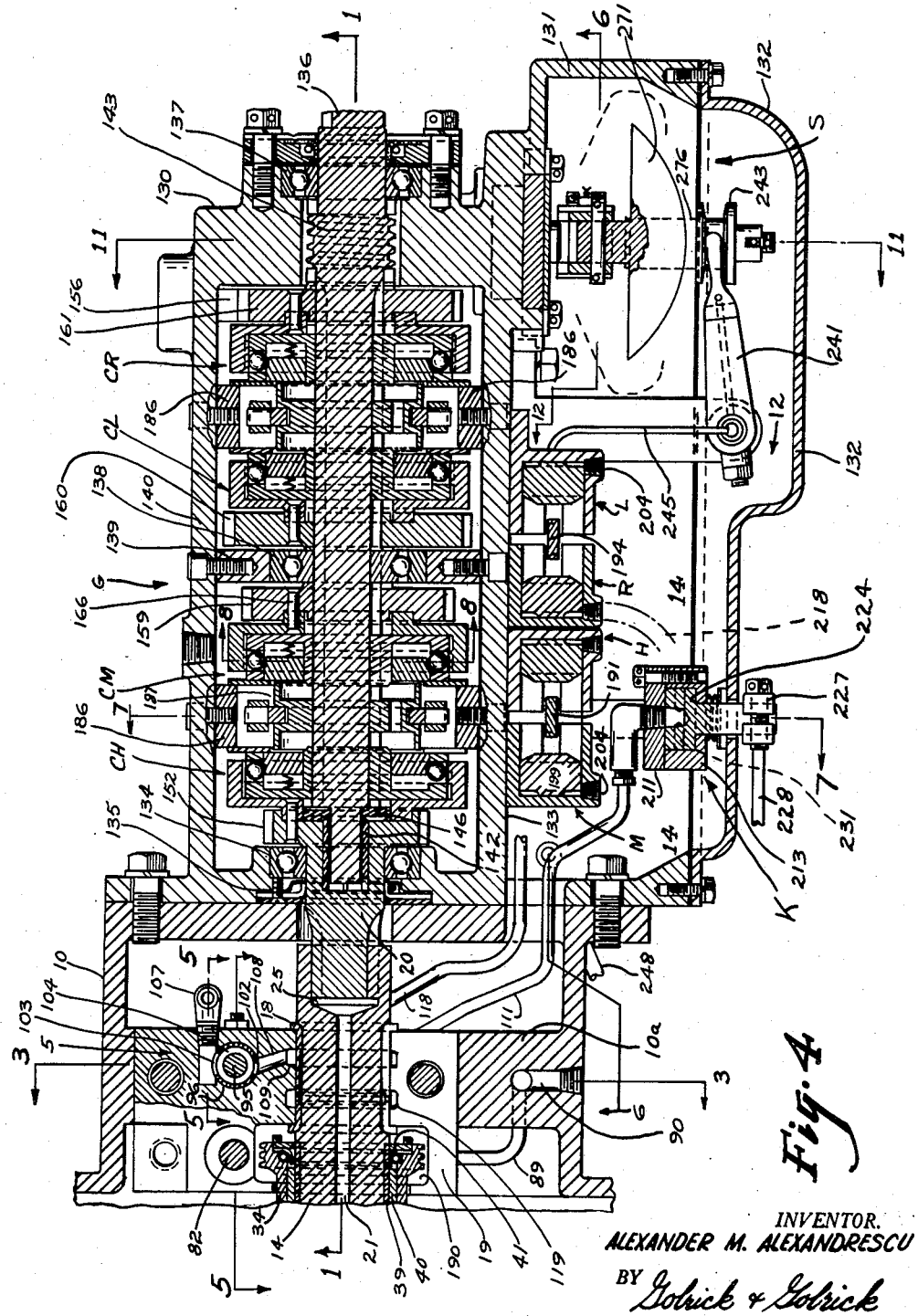

May 6, 1958 A. M. ALEXANDRESCU 2,833,159
AUTOMATIC HYDRAULICALLY OPERATED TRANSMISSION
Filed July 21, 1954 12 Sheets-Sheet 6

INVENTOR.
ALEXANDER M. ALEXANDRESCU
BY Gobrick + Gobrick
ATTORNEYS

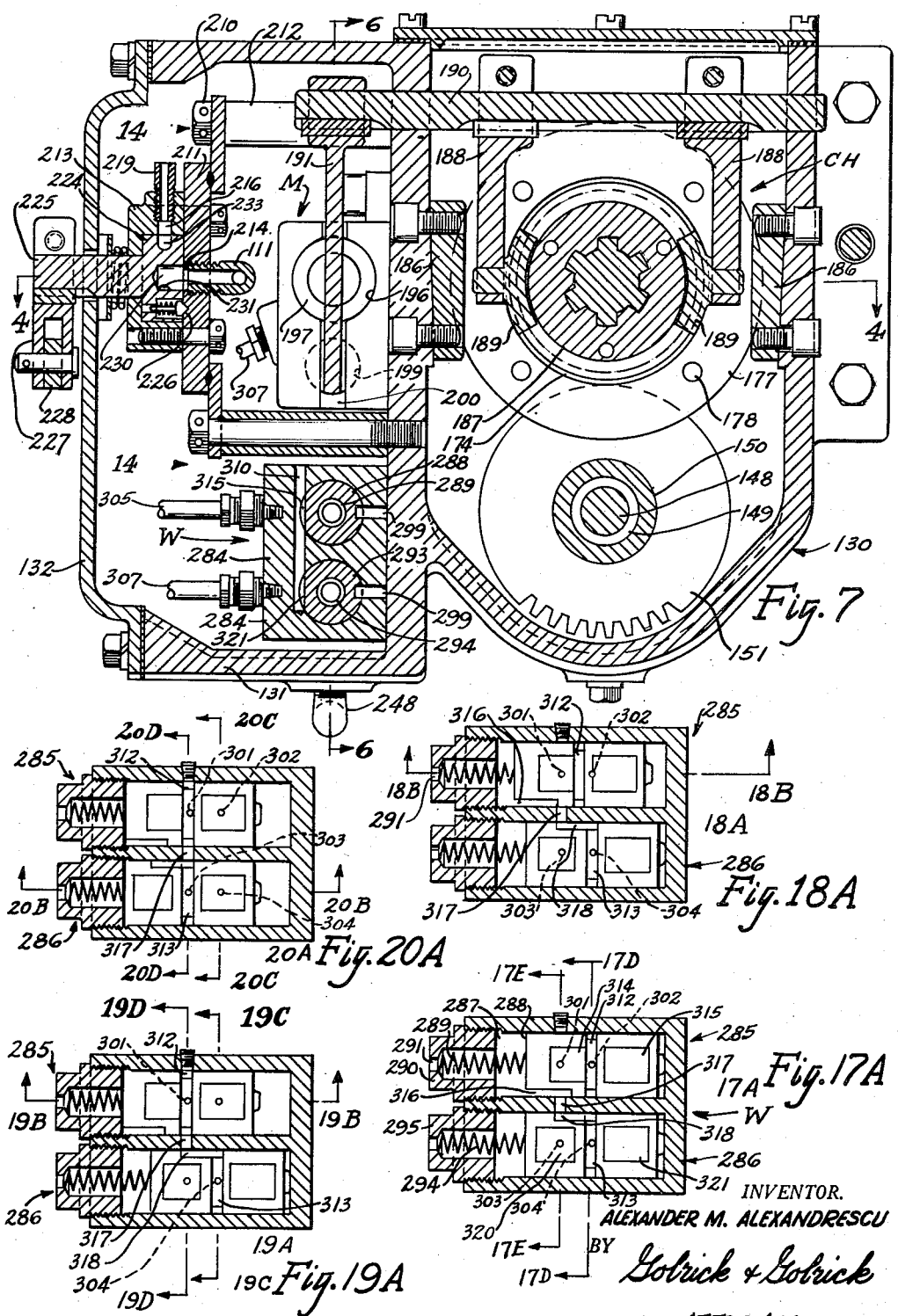

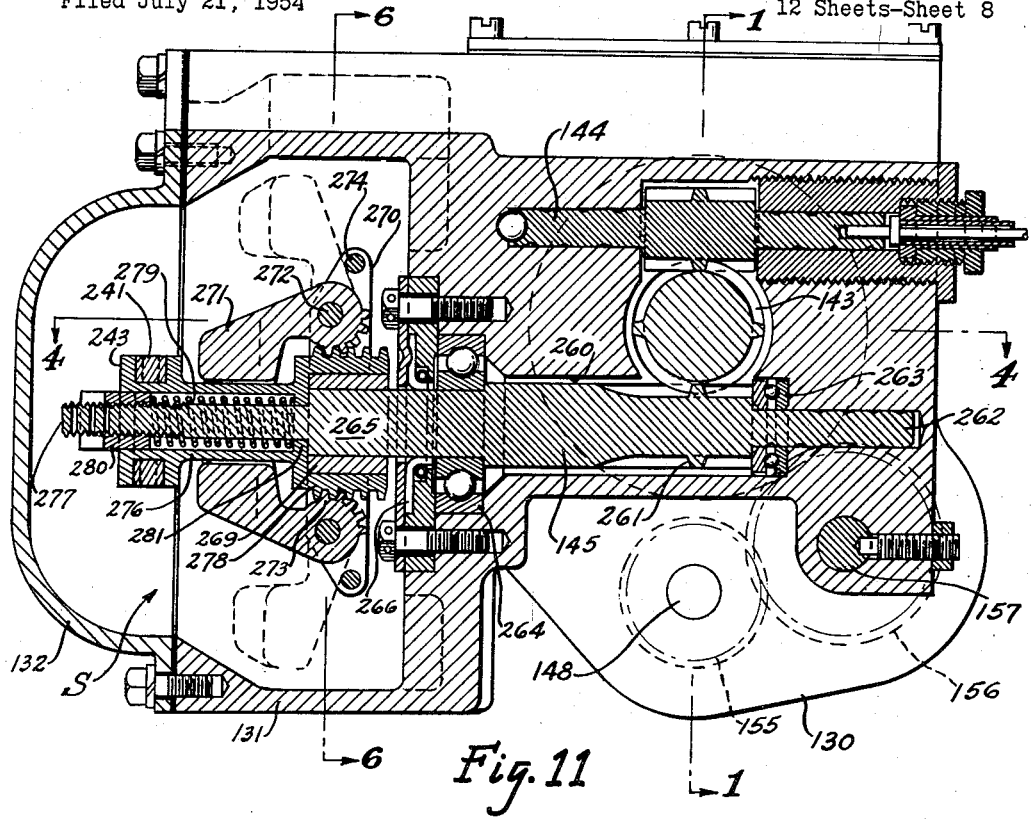
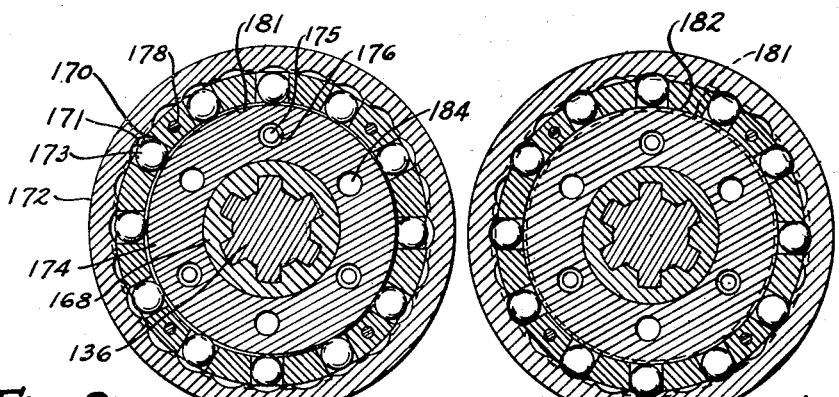
Fig. 11
Fig. 8
Fig. 9
INVENTOR.
ALEXANDER M. ALEXANDRESCU
BY Gobrick & Gobrick
ATTORNEYS

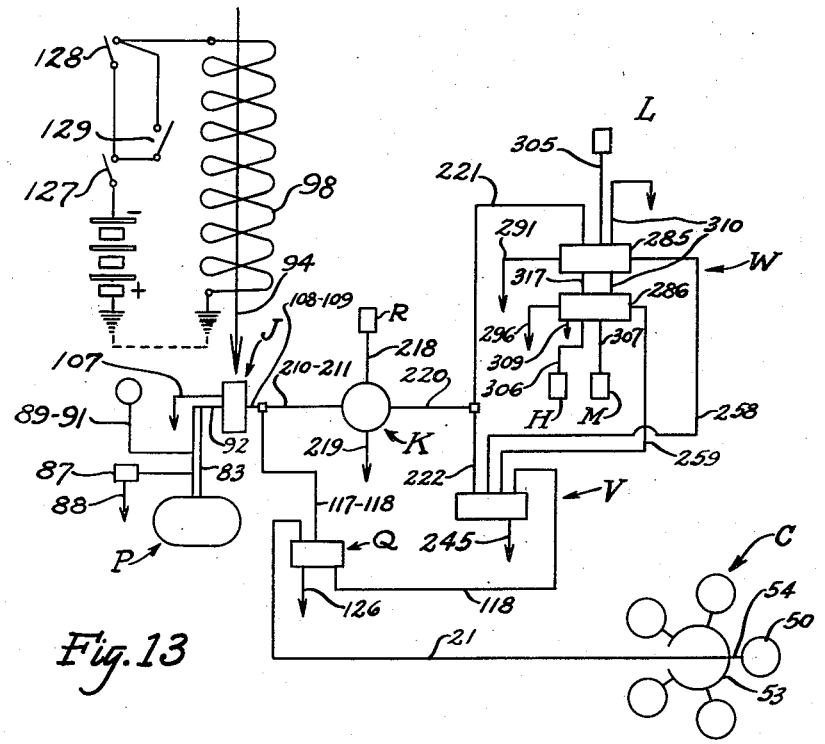
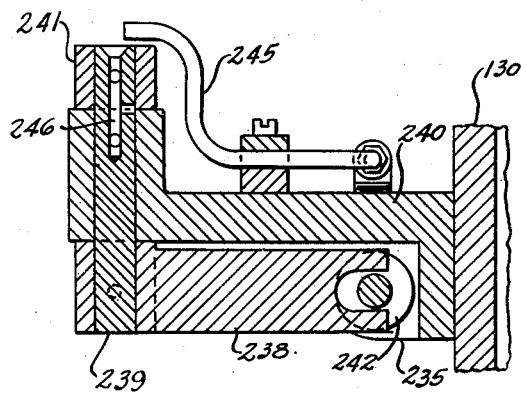
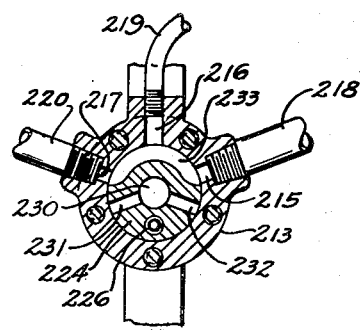

INVENTOR.
ALEXANDER M. ALEXANDRESCU
BY Gobrick & Gobrick
ATTORNEYS

May 6, 1958 A. M. ALEXANDRESCU 2,833,159
AUTOMATIC HYDRAULICALLY OPERATED TRANSMISSION
Filed July 21, 1954 12 Sheets-Sheet 11

INVENTOR.
ALEXANDER M. ALEXANDRESCU
BY
Golrick & Golrick
ATTORNEYS

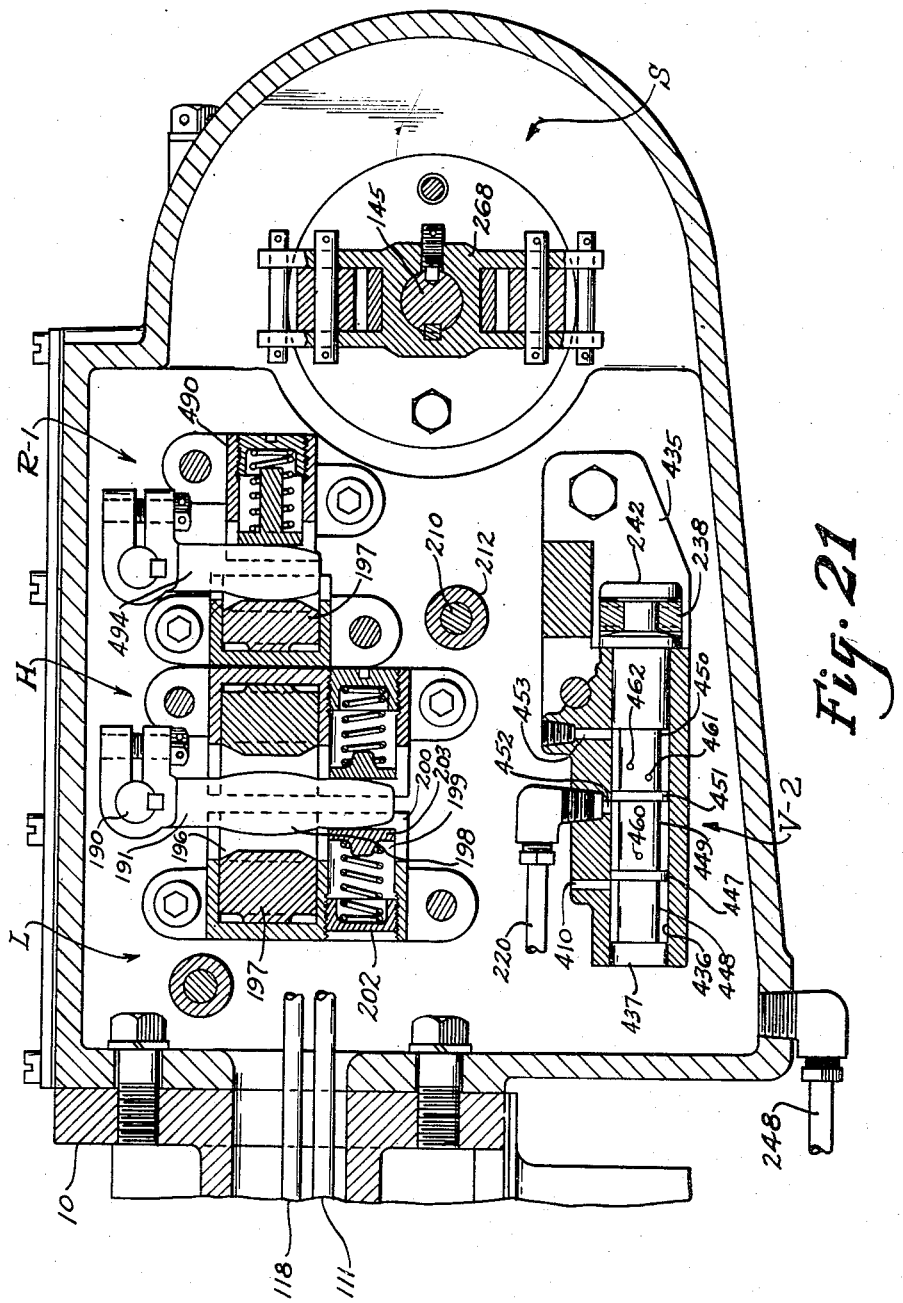

United States Patent Office 2,833,159
Patented May 6, 1958

2,833,159

AUTOMATIC HYDRAULICALLY OPERATED TRANSMISSION

Alexander M. Alexandrescu, Cleveland, Ohio

Application July 21, 1954, Serial No. 444,771

32 Claims. (Cl. 74—645)

The present invention relates generally to automatic transmissions, more particularly to a forward driving speed responsive transmission in combination with a hydraulic fluid coupling and is operated by hydraulic power for effecting gear changes and gear change control movements.

Automatic driving systems, particularly for automotive use, have often incorporated fluid couplings or fluid torque converters, utilized various devices or systems such as a planetary gearing system wherein different moving elements are selectively restrained or selectively engaged for effecting gear or speed changes, or transmissions wherein means are provided in response to vehicle speeds or torque demands for automatic selective shifting of gears into different meshing gear relations or wherein various output torque or speed conditions are obtained, by varying hydraulic reaction conditions in the fluid drive unit. These and other systems have involved untoward features of complexity in basic mechanical structure and control elements or of adjustment and maintenance of operating relations, or of inefficiency of torque transmission.

In this invention providing an automatic drive with free wheeling features and automatic speed responsive gear changes in forward drive, a fluid coupling unit with a high degree of torque transmission efficiency, which also includes a hydraulically actuated direct drive clutch, is interposed between the engine of the vehicle and a gear change box, and the latter provides change of gearing ratios without need of actual physical shifting of gears from one meshing position to another. The latter feature is obtained by the use of gears in continual mesh at fixed positions in each gearing path to the output shaft, with the last gear of each path rotatable on the output shaft but selectively engageable to the shaft by a ball clutch mechanism by force supplied through a corresponding hydraulic cylinder. Hence, though the terminology "gear shift" and the like be used hereinafter, it is to be understood that the gear change does not involve any physical shifting or change of gear meshing in the ordinary sense.

A pump, drawing hydraulic fluid from a pump beneath the fluid coupling unit and directly continuously driven from the engine, supplies hydraulic fluid under pressure for the maintenance of the fluid body in the coupling unit, for actuation of the direct drive clutch at high forward speed condition, and for actuation of the several hydraulic cylinders of the ball clutches in the gear box. The pump also supplies hydraulic fluid pressure for the hydraulically operated control system for the several forward speed gear changes.

A speed responsive mechanical device of the centrifugal governor type driven by the output shaft of the transmission, in combination with and moving a piston type valve to various positions corresponding to various forward speeds, is the primary automatic control point for forward speed gear changes. In the case of a transmission with two forward speed gear ratios, such valve itself handles the flow of fluid to and from the gear ball clutch operating cylinders for forward speeds. With three or more forward speed gear ratios and corresponding ball clutches, a relay type valve interposed in a hydraulic line from the pump is set to various positions controlling the application of hydraulic pressure to one or the other of the forward speed clutch operating cylinders by hydraulic pressure directed to elements of the relay valve by the speed responsive valve.

A drive selection valve, selectively set manually by the operator, directs fluid for operation of the gear clutch cylinders either directly to the cylinder for reverse; or for forward drive, indirectly through the speed responsive valve means to the forward drive cylinders. With the direct drive clutch, a relay valve actuated by pressure from the speed responsive valve means at high forward speeds controls the application of fluid from the pump to the direct drive clutch. Hence the relay and centrifugally controlled valves provide speed responsive valve means controlling the gear changes on forward drive.

The entire driving system is subject to the driver's initial control at two points—the drive selection control valve, operated by a lever or other manual means located at the driver's seat setting the hydraulic control elements for a reverse, forward or no-drive (neutral) condition; and a solenoidally operated main driving control valve for supplying or releasing shift operating and control pressures to the hydraulically actuated elements, which is controlled independently by a panel switch and a switch linked to the accelerator pedal so that upon depression of the pedal for driving, the switch is closed actuating the solenoid to move its associated valve to open position directing fluid pressure to the entire hydraulic system. Upon de-energization of the solenoid and its spring biased movement to closed position consequent upon release of the accelerator, the hydraulic control lines are cut off from the pump and opened through relief or vent channels, for return of fluid to the sump. When the solenoid valve is in open position for driving, fluid is directed to the drive selecting control valve and also to a relay valve controlling supply of fluid to the direct drive clutch. When the selector control valve is set for reverse, the fluid supply from the solenoid valve is applied directly to the reverse gear cylinder and the direct drive clutch remains inoperative as hereinafter explained. When set to neutral position, the selector valve returns fluid supplied thereto directly to the sump. When set to forward position, the selector valve supplies fluid from the solenoid valve to the relay valve which selectively directs the fluid to the gear change operating cylinders for various stages of forward drive; and also to the centrifugally operated piston valve, which, depending upon piston position supplies control pressure selectively and progressively to elements of the relay valve and, in addition, at highest speed to the direct clutch relay control valve.

An object of the present invention is a provision of an automatic transmission including an improved fluid coupling having an internal direct drive clutch therein;

Another object is the provision of a novel type gear change device for changing gear ratios in a transmission without change of the actual meshing of the gears whereby the gear wear ordinarily consequent upon physical gear shifting in ordinary transmissions is avoided with the use however of a simple gear tooth form.

Another object of the invention is the provision of a vehicle transmission incorporating a speed-responsive system for applying hydraulic forces effecting gear changes.

Another object is the provision of an automatic transmission wherein gear changes are effected automatically in response to the speed of the vehicle.

A still further objective is the provision of a hydraulic transmission including a fluid coupling and hydraulic powered gear change mechanism adapted not only to the light load automotive uses but also for heavy power transmission.

Other objects and advantages of the invention will appear from the following description and the drawings wherein:

Fig. 1 is a longitudinal vertical section taken through the principal parts of the automatic hydraulic transmission system of this invention;

Fig. 4 is a horizontal section of the transmission gear box and the automatic driving control valve taken through the shafts therein as indicated by the line 4—4 in Fig. 1;

Fig. 7 is a transverse vertical section taken through the transmission gear box as indicated by the line 7—7 in Figs. 1, 4 and 6;

Fig. 8 is a transverse section perpendicular to the axis of a clutch unit of the transmission box taken along the line 8—8 in Fig. 1 showing position or relation of the elements with the clutch disengaged;

Fig. 9 is similar to Fig. 8 but shows the relation of the elements when the clutch is engaged;

Fig. 11 is a transverse vertical section through the transmission box taken along the line 11—11 of Figs. 1 and 4 to show in axial section the governor type centrifugal speed responsive automatic shifting control device incorporated in this invention;

Fig. 12 is a fragmentary detailed sectional view of certain linkages associated with the speed responsive control taken as indicated by the line 12—12 in Fig. 4;

Fig. 13 is a schematic diagram of the electric circuit for the automatic driving control valve and the hydraulically operated control system of this automatic transmission;

Fig. 14 is a detailed sectional view of a driving selector or direction selector valve of the control system taken along the line 14—14 in Fig. 4;

Fig. 17A is a vertical axial section through the relay valve of Fig. 16 showing the position of the valve pistons or valving elements for the neutral condition or initial low speed condition, the location of certain ports being designated by the dotted circles therein;

Fig. 18A is taken similarly to Fig. 17A but shows the relation of valve elements in low speed setting;

Fig. 19A is similar to Figs. 17A or 18A showing the relation of valve elements for an intermediate speed setting or condition;

Fig. 20A is a vertical axial section through the duplex relay valve showing the positions of the valve elements for a high speed setting of the transmission;

Fig. 21 shows an arrangement of clutch actuating units in a transmission having only reverse, and low and high speed gears;

Figure 2:
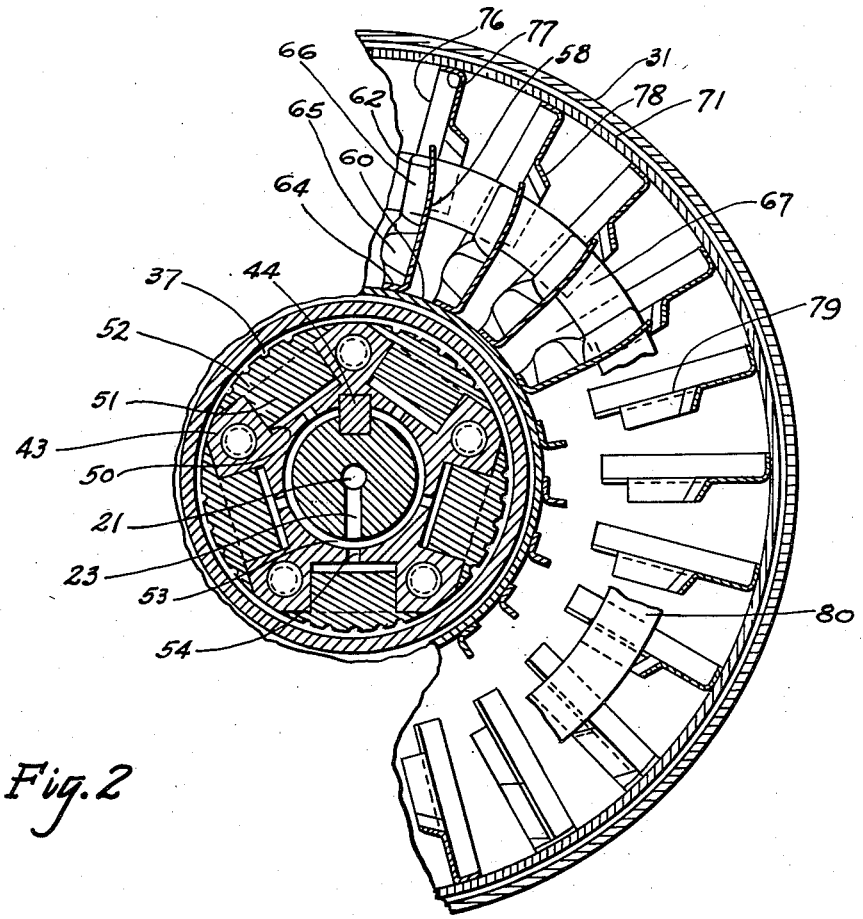
Fig. 2 is a transverse fragmentary sectional view of a direct drive clutch portion in the fluid coupling section of the transmission.
Figure 15:
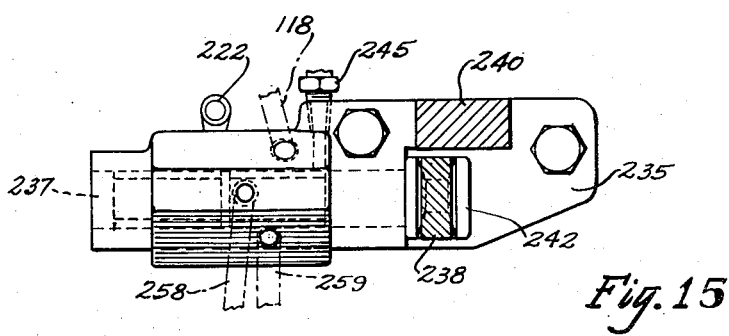
Fig. 15 is a side elevation of the shift control valve operated by the governor type speed responsive control device of Fig. 11, with the valve piston in innermost position.

The general organization of the automatic hydraulic transmission system of this invention which is described as applied to an automobile, may best be seen in Figs. 1, Fig. 4 and the schematic diagram of Fig. 13, the principal units thereof being the fluid coupling A with which there is associated a hydraulically operated direct drive clutch C serving, as it were, to by-pass torque mechanically past the fluid coupling unit, a hydraulically operated and controlled gear change unit G with associated hydraulic cylinder units R, L, M, H for effecting gear changes, a hydraulic fluid pump P, a solenoidally actuated driving control valve, or master valve J, for releasing or admitting fluid from the pump to the hydraulic elements, a piston type hydraulic shift control timing valve V mechanically linked to and set by a governor type centrifugal speed responsive actuating mechanism S to apply control pressure to the valves W and Q, a fluid pressure actuated duplex relay valve W for directing fluid pressure selectively to the units L, M, H for engagement of the gears in the gearing unit G on forward speeds, a hydraulically operated valve Q controlling the admission of fluid pressure from valve J to the clutch C for direct rather than fluid torque transmission through the coupling unit, and a driving selector valve K normally set from the driver's seat through a mechanical linkage to direct fluid from valve J either to unit R on reverse or on forward to the relay valve W for gear change powering pressure and to the timing control valve V for control pressure of the relay valves.

Fluid coupling and associated direct driving clutch

The fluid coupling unit A embodies improvements on the fluid coupling units disclosed in my co-pending application Serial No. 272,030 of February 18, 1952, now Patent No. 2,720,952 dated October 18, 1955, and the pump P is similar to that disclosed in the same application.

The housing for the fluid coupling unit comprises an upper housing member casting 10, a drawn sheet metal fluid pan 11 secured to each other and to the rear of the engine block B, the lower member 11 providing a sump for the hydraulic fluid of the transmission system, these members being provided with plug-closed filling and drainage ports 12 and 13. The reduced forward end of the output shaft 14 of the fluid coupling is journalled in a pilot bushing 15 pressed into a bore in the flanged end of the crank shaft 16 and is supported at a locus inward of the rearward end by half-shell bearings 18 held in a transverse web 10a of the member 10 by bearing pillow block 19 fitted into a corresponding recess in the web and held by studs and nuts. The back end of the shaft 14 is recessed and provided with a female spline formation for driving engagement with splined input shaft 20 of the gear shift unit. The coaxial bore 21 extends inwardly from the splined recess to form a fluid passageway between the radial bores 22 and 23 opening respectively to a circumferential groove 121 in bearing 18 and to the hydraulic clutch C for supply of fluid actuating the clutch. Lubrication grooves may be cut in the bearing face extending out from the groove 121 partway along the length of the bearing. A felt pad 25 or other type of sealing means is provided between the end of shaft 14 and the input shaft 20 as an end seal for the passageway 21.

The fluid coupling here shown includes two generally cup-shaped members 30 and 31 bolted together along mated circumferential flanges between which a sealing gasket is interposed, the member 31 being provided with a plug-closed filling port 32 and the member 30 having secured thereto a starter ring gear 33. The member 30 is reinforced by an annular plate about a central aperture for securement by machine bolts to the end flange of the crank shaft 16, while 31 is centrally apertured to fit the end of collar 34, and secured to a flange thereof coaxially by rivets passed through the flange and a clutch drum 37. The outboard end of collar 34 is provided with a worm gear formation for driving the pump P continually as hereinafter described.

A longitudinal slot or groove 38 passing under the length of a sleeve 39 fitted on the shaft includes a spring loaded check valve 42 permitting fluid to pass out into the housing space from the interior of the coupling under certain conditions. A sleeve bearing 40 pressed into the collar 34 is longitudinally grooved for lubrication by hydraulic fluid while the outboard end of the collar is recessed or counterbored to receive a rotary seal 41. A hub 43 extending within the drum 37 is keyed to the inboard end of the shaft 14 by a set screw 45 and has bolted to a shoulder thereon a driven turbine element or runner indicated by the general reference numeral 46.

A thrust bearing 47 between the end of the engine crank shaft and the shouldered end of the hub, and a second thrust bearing 48 between the inner end of the collar 34 and the adjacent face of hub 43 locate the turbine driven element 46 axially within the coupling housing. The portion of the clutch hub extending within the clutch drum 37, as may be seen in Fig. 2, is substantially pentagonal in cross section with the faces thereof bored at 50 to receive the piston portions 51 of clutch members which carry segmental friction shoes or faces 52 for engagement with the cylindrical interior of the clutch drum. An interior circumferential groove 53 in the hub member 43 coincides in position with the radial fluid channel 23 of shaft 14 and opens through apertures 54 to the several cylinder bores of the hub for admission of hydraulic fluid thereto. Thus, upon admission of hydraulic fluid under pressure to the channel 21 the piston and clutching members 52 are pressed outwardly against the drum to effect a direct driving connection between the engine crank shaft and the shaft 14. To permit fluid to escape from the coupling casing and avoid fluid back-pressure on the clutching members, one or more openings 55 are provided in the drum and the thrust bearing 48 is internally circumferentially grooved and provided with radial channels putting the interior of the drum into communication with the inner end of the outlet slot 38.

To the opposite end walls of the fluid coupling casing, that is to the radially extended portions of casing members 30 and 31, there are secured a pair of fluid impeller units 58, mirror images to each other but otherwise substantially identical. Each impeller comprises a drawn sheet metal base 59 having a frusto-conoidal central portion 60 curving at the cone base into a more or less radially extended flange 61. The periphery of the flange portion 61 when viewed in axial section is curved toward the side on which lies the apex of the base. The shape and arrangement of the blades on the impeller and driven units 58 and 46 may be seen in Figs. 1 and 2. A plurality of impeller blades 62 which each may be die stamped or formed from sheet metal in the shape appearing in the drawings, are secured at their inner ends and along a lateral edge to the base member 59. Each impeller blade extends generally radially outward about half its length and then curves forwardly in the direction of rotation, a rearwardly extending flange 63 along the straight and forwardly curved portion and at the radially inner edge forward flange 64 being provided for spot welding to the base 59. At the inner end each impeller blade has a fluid shifting vane or deflecting portion 65 extending inwardly under the driven blades of the runner turbine assembly 46. The outer edge of the blade from the periphery of the base to the free lateral edge of the blade slope inwardly at an angle of about 30° to the axis of rotation to direct fluid into the bucket portions of the driven blades. The bottom securing flange 64 is continuous with a forwardly directed edge flange carried around the edge of the vane 65 and into the flange 66 along the radial portion of the blade. An annular flat band 67 spot welded to the radial flange 66 outside the shifter portions of the blades reinforces the free edges of the blades for mutual support against deflection under fluid pressures. This annular plate or band also forms with the opposite flange 61 of the base member 59 a channel between the fluid shifter vane 65 and the outer ends of the blades.

The turbine runner or driven part 46 of the fluid coupling comprises a radial disk 70 bolted to the hub 37 and carrying a pair of driven blade assemblies or units 71 identical mirror images of each other but otherwise of identical form. At about the locus of the impeller shifter vanes 65 there is a plurality of openings 72 through the disk for fluid circulation. Each assembly 71 of driven blades comprises a centrally apertured cup-shaped drawn sheet metal blade-carrying base 73 spot welded or otherwise affixed along the radial portion 73 thereof to the disk, carrying blades 75.

Each driven blade 75 is a roughly L-shaped sheet metal stamping having forwardly flanged lateral and outer end edges 76, 77 secured by a spot welding or brazing to the cylindrical and radial ports of the cup-shaped base member, the area of the blade being disposed in a substantially radial plane. Each driven blade has a bucket formation at its outer end into which fluid is projected by the impeller blade assembly rotating within the driven assembly. The bucket is formed by reflecting rearwardly, with respect to the direction of rotation, an edge flanged portion 78 extending obliquely inwardly to a radial fluid return portion of the blade which includes along its free margin a radial flange 79 as a continuation of the bucket flange.

These flanged free edges 79 of the return portions adjacent the impeller blades are joined by an annular plate or band 80, whereby the blades are strengthened against deflection under fluid pressure and a radially extending fluid return channel is provided leading from the turbine buckets to the space traversed by the fluid shifting vanes. The shape of the blades is, in general, similar to that shown in Fig. 3 of the aforesaid application Serial No. 272,030. By virtue of the oblique outer end edge of the impeller blade across the curved part of the blade, the entire end edge of the impeller blade does not simultaneously transit the width of a turbine bucket edge, so that as an impeller blade passes a turbine bucket there is no sudden cutoff, even localized, of fluid flow. The area of fluid flow cross-sections of the impeller channels is about twice that of the return channels of the driven blade assembly. However, the return channels may be increased to the size of the impeller channels for higher fluid flow rates, for example when this type of impeller is used for high speed engines.

Pump and solenoid valve

Figure 3:
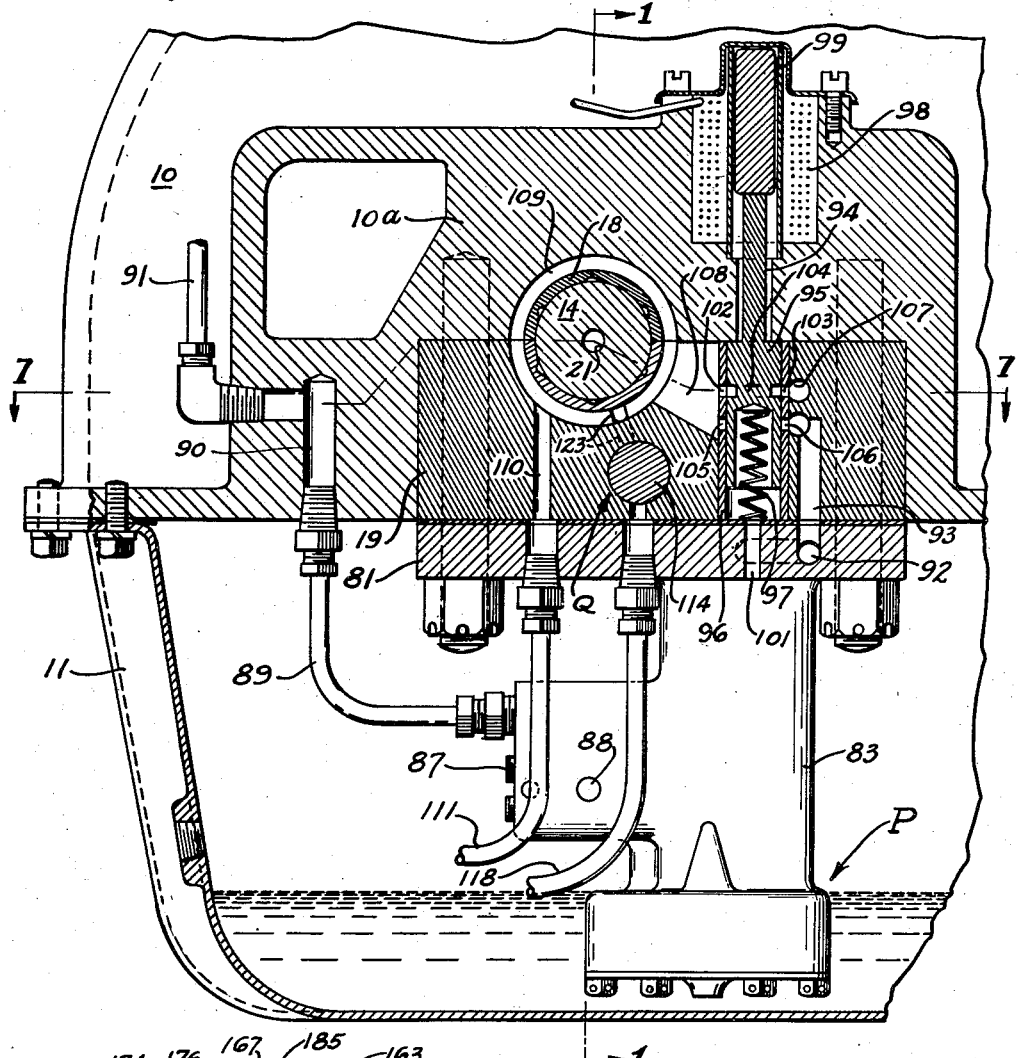
Fig. 3 is a transverse vertical section through the solenoid operated automatic driving control valve as indicated by the line 3—3 in Fig. 1.

As may be seen in Fig. 3, the pump P includes a body casting having a base flange 81 at the upper end thereof gasketed and secured to the bottom of the pillow black 19 by studs extending from the web through the pillow block and base. A pump shaft 82, journalled in the bottom end wall of the reservoir 83 and in the pillow block, carries at its upper end a pinion 84 meshing with the gear formation on the collar 34, extends through the reservoir to pump gear element 85 meshing with the idler element 86 in the lower end of the casing. The lower end of the pump with an inlet port opening through the bottom blade of the pump between the gear elements thereof, is submerged below the normal liquid level of hydraulic fluid in the sump provided by the lower coupling housing member or pan 11. The outlet from the pump gear elements opens into the tank or reservoir. A lateral extension of the pump casing opening interiorly to the reservoir includes a pressure regulating or relief valve 87 having a spring loaded ball valve member which may open when a preset pressure is exceeded to return fluid from the pump reservoir through the lateral outlet ports 88 to the sump.

A fluid pressure line 89 to passageway 90 drilled in the housing member 10 and line 91 lead from the pump reservoir 83 to a pressure indicating instrument, say on the dash panel of the vehicle. A horizontal channel 92 drilled in the base of the pump from the reservoir opens upwardly into a matching vertical channel 93 drilled in the pillow block to the lower port 206 of valve J. The pillow block 19, of generally rectangular shape, is fitted into and secured in the transverse web 10a forming therewith a seat for the two half-shells of the bearing 18 supporting the shaft 14 at a reduced portion as previously described. On the block 19, a semi-circular or trough shaped formation 19a beneath the outboard end of the collar 34 provides a receptacle for hydraulic fluid for lubricating the collar, worm gear and the pump shaft pinion meshed therewith.

The valve J (see Figs. 3 and 4) includes a plunger 94, preferably non-magnetic, the lower larger end of which forms a plunger type or reciprocating type valve member 95 vertically slidable in a sleeve 96 held by a set screw or press-fitted into a vertical bore through the pillow block. The lower end of the member 95 is bored to receive a compression spring 97 reacting against the upper face of the pump base whereby the valve member is biased upwardly to an "off" position. The upper end of the plunger 94, reduced to pass through the web into a solenoid coil 98 received in a vertical bore in the top of the web, carries an iron armature member 99 which when the valve is in uppermost "off" or closed position extends partly out of the upper end of the solenoid coil. The shoulder at the upper end of the valve member provides a stop for the upward movement of the plunger under spring bias, and the pump base a stop for downward motion when the solenoid is energized. The lower end of the valve is vented by a passage 101 through the pump base.

The sleeve 96 has a pair of diametrically disposed exhaust ports 102 and 103 put in communication when the valve is in its "off" or uppermost position by the circumferential groove 104 on the valve member 95 aligned therewith and blocked when the valve is at "on" position. A lower second pair of diametrically disposed ports 105 and 106 in the sleeve closed off by the valve member in "off" position are put into communication by the groove 104 when the valve is moved downward to "on" position.

The exhaust port 103 opens laterally of the pillow block through an L-shaped riser tube 107 to direct liquid exhausted by the valve J to the sump, the liquid in the riser forming an air seal, and providing liquid to keep the valve elements wetted when in closed position.

The valve ports 102 and 105 open through slot 108 and the circumferential channel 109, formed jointly in the web and pillow block around the bearing 18, and a vertical passage 110 through the pillow block and a threaded opening in the base flange of the pump to a feed line 111 leading to driving selector valve K.

The pillow block is bored inwardly at 112 from its rear face and closed by a threaded cap 113 to form a valve body within which the moveable valve piston membere 114 of valve Q is located (see Figs. 1 and 3). The valve piston 114 is recessed at its inner end to receive a compression spring 115 biasing it toward the valve cap to a "closed" position and a projection 116 on the other end spaces the piston from the cap for access of valve actuating hydraulic fluid entering through the passage 117 in the pump base and pillow block from a fluid pressure line 118 leading to a controlled port of the shift timing valve V. A second channel 119 about the bearing 18, similar to 109, opens through radial bearing apertures 120 to an inner circumferential groove 121 on the bearing face coincident with the plane of rotation of the shaft radial channels 22, and through radial valve port 122 to the base 112 of valve Q. A second radial port 123 axially spaced from 122 opens to channel 109. The valve piston 114 is circumferentially grooved at 125 and reduced at its inner end, so that in off position the direct drive clutch cylinders may vent fluid through shaft channels 23, 21, 22, the bearing and the pillow block channels 121, 120, 119, 122, and the passage 126 in the end of the valve cylinder to the fluid trough 19a and hence to the sump; and when the valve piston is displaced inwardly against the bias of the spring 115 by fluid pressure from the line 118 putting valve ports 122, 123 in communication through groove 125 and blocking vent 126, fluid delivered by the pump through valve J to channel 109 is admitted by the passageways previously described to the coupling clutch cylinders for direct driving engagement of the clutch.

The electrical circuit controlling energization of valve solenoid 98 appears in Fig. 13. A main switch 127 which may be associated with the usual key-operated ignition switch of the vehicle electrical system and a switch 128 linked to the accelerator pedal are placed in series between the ungrounded terminals of the battery and solenoid, and manually operated auxiliary panel switch 129 is in parallel with the accelerator switch. With the main switch on, when the accelerator is depressed, closing switch 128, the solenoid is energized moving the valve plunger downward to open position to direct fluid to valve K and Q and the hydraulic control and actuating elements supplied thereby; and when the accelerator is released switch 128 opens to deenergize the solenoid, close valve J, closing off the pump from the lines valves R and Q and permitting the release of pressure in the hydraulic elements supplied thereby through riser 107. Switch 129 may be used to control the solenoid and valve J independently of the accelerator for example in vehicle repair and testing, and particularly when it is desired to utilize the braking effect of the engine as in descending hills.

Gear change unit

The gear change unit G is enclosed in a housing 130 secured to the rear face of the coupling housing member 10 and to the vehicle chassis in any suitable manner. As may be seen in Figs. 4 and 6, lateral flange 131 with a cover plate 132 bolted thereto form a compartment extending laterally from housing wall 133 mounting or enclosing the majority of the gear change control elements— the valve K, the relay control valve W, the speed control unit S and associated shift control valve V, and the several gear change or shift actuating hydraulic cylinder units R, L, M, H for gear ball clutches CR, CL, CM and CH. The back wall of the coupling housing and the adjacent flange of the compartment are apertured for fluid line 118 and 111.

The short input shaft 20 (Figs. 1 and 4) is rotatably mounted in the forward wall of the housing by a bearing 134 and is sealed to the housing by rotary oil seal 135 secured in a recess in the outer face of the housing end wall. An output shaft 136 having a splined portion within the unit is journalled by the bearing 137 in the rear end wall of the housing at its central portion by a bearing 138 supported by a spider or block 139 bolted to the housing side walls 140 and 141, and at its forward reduced end by a pilot bushing 142 received in an axial bore into the inner end of the input shaft 20, a thrust bearing 146 being interposed between the shafts. The inner race of bearing 138 is female splined to fit the shaft 136. A worm gear formation 143 on shaft 136 inboard of rear bearing 137 meshes with upper and lower pinions formed on transverse shafts 144 and 145, journalled in the housing rear wall of the speedometer cable take-off and the speed control unit S hereinafter described.

In the lower part of the casing a longitudinal stud 148 secured in the opposite housing end walls supports through sleeve bearings 149 the long multiple gear unit 150 as a countershaft having at its forward end a gear formation 151 in constant mesh with the gear formation 152 on the inner end of the input shaft 20 whereby 150 is continually driven by shaft 20; a second gear formation 153 for medium or second speed, a smaller gear formation 155 in mesh with a reverse idler 146 journalled on a stud shaft 157 mounted in the casing. On the splined output shaft there are provided for the medium or second speed, the low speed and reverse, the gears 159, 160 and 161 constantly meshing respectively with the medium and low speed gear formations 153, 154 on the gear member 150, and with the reverse idler. These gears 159, 160, 161 rotatably mounted to the splined shaft are selectively engaged to the splined shaft 136 by ball clutch units CM, CL, CR which are identical in all respects, there being a similar ball clutch unit CH for linking the input shaft 120 directly to the splined output shaft.

Figure 10:
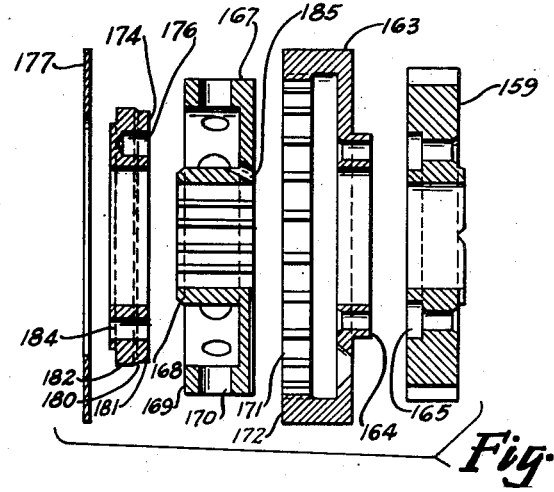
Fig. 10 is an exploded view of the principal elements of the clutch shown in Fig. 8 with the balls thereof omitted.
Figure 22:
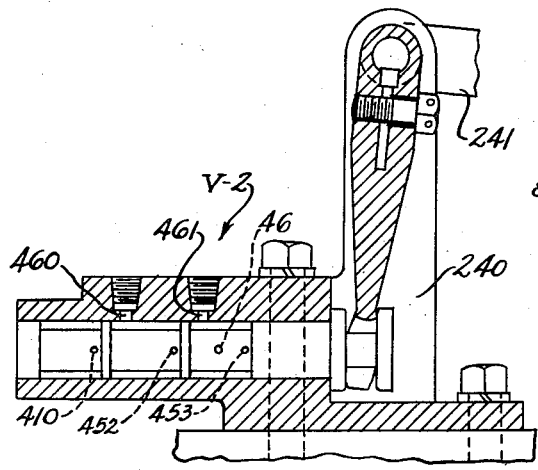
Fig. 22 is a horizontal axial section through a speed responsive valve modified for use with the three clutch actuating units of Fig. 21 with elimination of the duplex relay valve.
Figure 23:
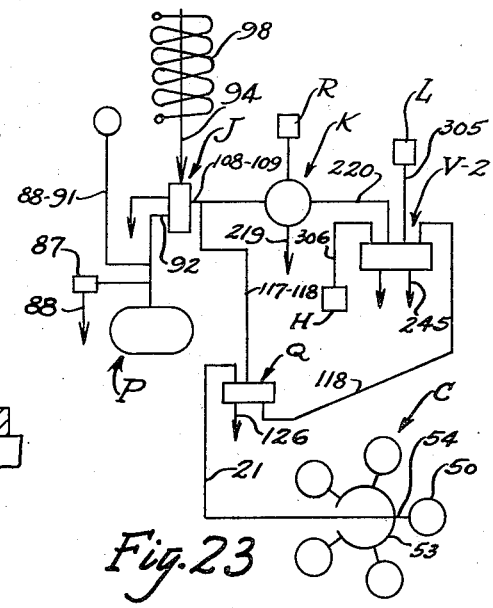
Fig. 23 is a schematic diagram of a control system embodying the elements of Fig. 21 and 22.

The structure of these ball clutch units may best be seen in Figs. 8 and 9, representing the disengaged and engaged relation of the elements, and in the exploded view of Fig. 10. Each clutch unit comprises a shallow cup-shaped outer driving member 163 having a flange 164 around a central aperture fitted into a locating groove 165 in the adjacent radial face of the associated gear member to which it is secured by a plurality of rivets 166; a driven member 167 having a hub portion 168 splined to the output shaft 136 and a cylindrical rim flange 169 provided with a plurality of radial openings 170 in number half of the arcuate recesses 171 in the inner face of the surrounding circumferential flange 172 of the driving member; hardened steel clutch balls 173 located in the radial openings of the driven member as a carrier, and an annular plunger axially moveable on the driven member hub to displace the clutch balls outwardly into engagement with the driving member recesses for clutch engagement. The diameter of the clutch balls is, of course, greater than the thickness of the carrier flange or rim 169 of the driving member, and the driving, driven, and plunger members are of hardened steel. The plunger is biased outwardly to disengaged position by a plurality of compression springs 175 held in the bores 176 thereof and reacting against the adjacent radial face of the carrier member; and the annular plate or disk 177, secured to the end of the driven member rim flange 169 by rivets 178, serves as a retainer element and stop for the plunger 174 in outward movement under bias of springs 125. The periphery of the plunger 174 has a ball camming shoulder 180 sloping from the reduced inner end 181 to the outer cylindrical portion 182.

When in disengaged position the narrower portion 181 of the plunger is the locus of contact of the balls, retaining them in position in the carrier yet permitting them to be displaced inwards out of engagement with the grooves on the driving member. When the plunger is moved inward against the bias of the compression springs 175, the balls are cammed radially outwardly by shoulder 180 into engagement in the locking recesses 171 to be held in engagement by the portion 182 of the plunger. Thereby the driven or carrier member 167 is locked to the driving member 163, clutching the corresponding gear member to the output shaft. In the case of the high speed clutch CH, the driving clutch member is secured to the gear end face of the input shaft 20. The plunger and driven clutch members are provided with apertures 184, 185 to permit flow of lubricant to and from the several moving surfaces. Spacer blocks 186 bolted to the lateral housing walls project inwardly between the edges of the retainer plates of opposed clutch units to maintain the latter in axial position between the bearings.

From this description of the ball clutch units it is apparent that the effect of the actual physical shifting of gears in prior transmissions, that is, selective choice of gear trains from an input to an output shaft, may be had without any physical shifting of gears and the attendant problems of proper timing for easy shifting, gear wear due to shifting in and out of mesh, or the need of specially generated gear tooth forms.

To engage selectively the opposed clutches, a shipper ring 187 is splined to shaft 136 between each of the opposed pairs of clutch units, as may be seen in Figs. 4 and 7. The shipper ring may be displaced axially from a neutral position to bear endwise on the plunger in one or the other of the opposed clutches, the axial shifting being effected by rocker arms 188 carrying pivoted opposed dogs 189 engaged in a groove on the shipper ring. The rocker arms are keyed to and clamped on a rocker shaft 190 journalled in the lateral housing to project into the lateral compartment of the gear unit. To the rocker shaft for the direct and second or medium speed clutch units there is keyed a lever arm 191 extending downwardly between opposed hydraulic actuating units H and M, but the rocker shaft for the low and reverse clutches is keyed to a short lever arm 192 connected by a link 193 to a second lever arm 194 pivotally secured by a bracket to the housing wall and disposed between opposed actuating units L and R in a manner similar to the arm 191. The actuating units H, M, L, R, each comprise a body or base, bolted to the housing wall, horizontally bored from one side to form a hydraulic cylinder 196 wherein a piston 197 is movable to bear outwardly against the arcuate piston contact surface 198 of the lever 191 (or 194) and from the other end to form an arm return spring cylinder 199. A vertical end slot 200 through the centers of the closed end of cylinder 197 and open end of cylinder 196 accommodate the lever 191 (or 194). In the lower bore 199 a return compression spring 201 is interposed between the retaining plug 202 and the bearing plate 203 bearing against the lower end of the lever arm to bias the latter toward a neutral position. A fluid port 204 opens laterally to cylinder 196 behind piston 197 for application of pressure controlled by the speed responsive valve means later described. The opposed actuating units are spaced and aligned so that the rocker arm when in neutral position as engaged in both vertical slots, and when moved by the piston of one unit is displaced inwardly into the opposed actuating member thereby compressing the spring of the latter to develop a force restoring the rocker arm and piston when the hydraulic pressure initiating such movement is released.

Hydraulic control system

The relay valve Q for the clutch in the coupling unit, the clutch cylinders for the ball and coupling clutches, the pressure control valve 87 on the pump, and the solenoid operated valve 5 have already been described with the parts of the transmission with which they are physically associated. The driving control valve K, best seen in Figs. 4, 7, and 14, is mounted within the lateral compartment to the housing wall by bolts 210 passed through lugs on the valve base plate 211 and spacer sleeves 212 into the housing wall. A hollow cylindrical member 213 with open end bolted to the base plate 211 forms a symmetrical valve body into which open the fluid supply line 111 through an axial port 214 in the base, and the angularly spaced radial ports 215, 216, 217 in member 213; port 215 for the supply line 218 to the port 204 of reverse unit R, the fluid exhaust port 216 opening through vertical exhaust line 219 as an air seal riser tube to the control compartment space, and port 217 for a feed line 220 branching through lines 221 and 222 to the relay valve W and the shift control valve V for forward drive control. A rotary valve member 224, with shank 225 extending through body member 213 and compartment cover 132 is held by a detent device 226 engaging base plate notches at a selected neutral, forward or reverse position to which it is set through a lever arm 227 and link elements 228 by a driving selector indicator arm at the driver's seat. Stop pins in cover 132 limit the excursion of arm 227 from neutral to forward and reverse positions. A spring biased sealing washer interposed on the valve shank between the body and compartment cover seals the control compartment from entrance of dust.

An axial channel 230 opens radially through channels 231 and 232 in the valve member 224, and in that peripheral surface of over 180° between 231 and 232 a groove forms a passage 233. The spacing of the valve passage and ports is such that at neutral setting of the valve passage 233 puts the lines 215 and 220 into communication with the exhaust port 216 and line 219, and with the valve setting to either side of neutral, line 111 is in communication with either the reverse cylinder feed line 218 or the supply line 220 leading to relay valve and shift control valve V.

The body 235 of valve V (see Figs. 6 and 7), secured to the housing wall, is bored to form a cylinder 236 within which the piston or plunger valve member 237 is reciprocable by a lever linkage to the centrifugal device S comprised of an arm 238 fixed on the lower end of vertical shaft 230 journalled in a bracket arm 240 on the valve body, and a second arm 241 fixed to the upper end of the shaft at right angles to the first arm, the forked rounded ends of the arms being engaged respectively in the circumferentially grooved head portion 242 of the valve piston 237 and head 243 of the rack sleeve element in S. To lubricate the linkage, a line 245 from a top exhaust port 253 of the valve V delivers hydraulic fluid to the vertical passage 246 bored into the upper end of shaft 239 and opening through radial apertures to the journal surface of the bracket, at the bearing plane of arm 241 on the end of the bracket, and to a central bore in arm 241 leading to a felt pad in the fork crotch at rack sleeve head 243. Line 245 serves also as an air seal riser tube. It may be here noted that fluid leaking from the clutch cylinders or exhausted to the control compartment from valves V, K and W is returned to the sump 11 by a line 248 leading from the lowest point of the bottom portion of flange 131 back to the sump. The inward travel of piston 237 is limited by head 242 contacting the cylinder end as a stop and the outward travel by stops in the device S.

Here are two circumferentially relieved sections or flat grooves 249 and 250, separated by a flange 251 of full piston diameter, cut on the piston. A fluid inlet port 252, connected by lines 222 and 220 to port 217 of valve K, and the exhaust port 253 connected to exhaust line 245 open to the cylinder interior in axially spaced relation at the top of the valve body, the spacing being such relative to the piston dimensions that at all times inlet port 242 opens to the space provided by relieved or grooved portion 249 of the piston, and port 253 to the grooved portion 250 with the flange 251 forming a movable seal between these ports. Three controlled outlet ports 255, 256, 257 spaced progressively away from the innermost position of flange 251 are connected to the upper half 285 of relay valve W, the lower half 286 of W and the control pressure port 117 of valve Q by lines 258, 259 and 118 respectively. These controlled ports are also slightly spaced circumferentially to allow space for the threaded connections of the lines to the valve body.

Thus at the extreme inward positions of piston 237 for engine stopped (or idling) and high speed conditions, lines 258, 251 and 118 are commonly connected to exhaust line 245 in the one extreme and to feed line 222 from valve K in the other, with the lines 258, 259 and 118 successively opened to 222 as the vehicle picks up speed.

In the centrifugal device S associated with the valve V (see Figs. 6 and 11) the shaft 145, extending into the transverse housing bore 260 and driven by output shaft worm 143 meshing with integral pinion 261, is journalled at reduced end 262 in the transmission housing 130 with a thrust bearing 263 between the housing and a shoulder thereon, and by a ball bearing 264 on reduced portion 265 held in a counterbore recess by an oil seal and retainer plate assembly 266 bolted to the housing sidewall, the inner race of 264 and thrust bearing 263 in abutment with shoulders formed by the reduced shaft portions 265 and 261 serving to maintain the shaft in position. An elongated H-shaped bracket member 268, with hub 269 fitted on and keyed to the outer reduced portion 265 projecting into the control compartment, between each corresponding pair of parallel legs 270 thereof carries a weight member 271 pivotally mounted on a pin 272 and having a segmented gear formation 273 concentric with the pivot axis, weight stop pins 274 being located between the outer ends of the legs 270.

A sleeve member 276 slideably mounted on reduced shaft extension 277, and having at its inner end rack elements 278 meshed with the weight gear segments 273 is biased inwardly by compression spring 279 interposed on shaft extension 277 between a round nut 280, threaded on the end of the shaft extension, and the inner flange 281. The sleeve 276 is supported in coaxial relation to shaft 145 by the nut 280 bearing on the inner bore of the sleeve and flange 281 bearing on extension 277. A circumferentially grooved head 243 on the sleeve 276 engages the bifurcated end of arm 241 of the valve linkage, so that as the vehicle and hence output shaft 136 picks up speed, the attendant outward swing of weights 271 against bias of return spring 279 is communicated through rack sleeve 276 and arms 241, 238 to move the valve piston 237 outwardly, and with diminishing speed, the restoring force of spring 279 in returning sleeve 276 causes the valve piston to move inward. The pre-stress of spring 279, regulated by position of nut 280, controls or predetermines the vehicle speeds at which the controlled ports are opened and the functions controlled thereby come into operation.

Figure 6:
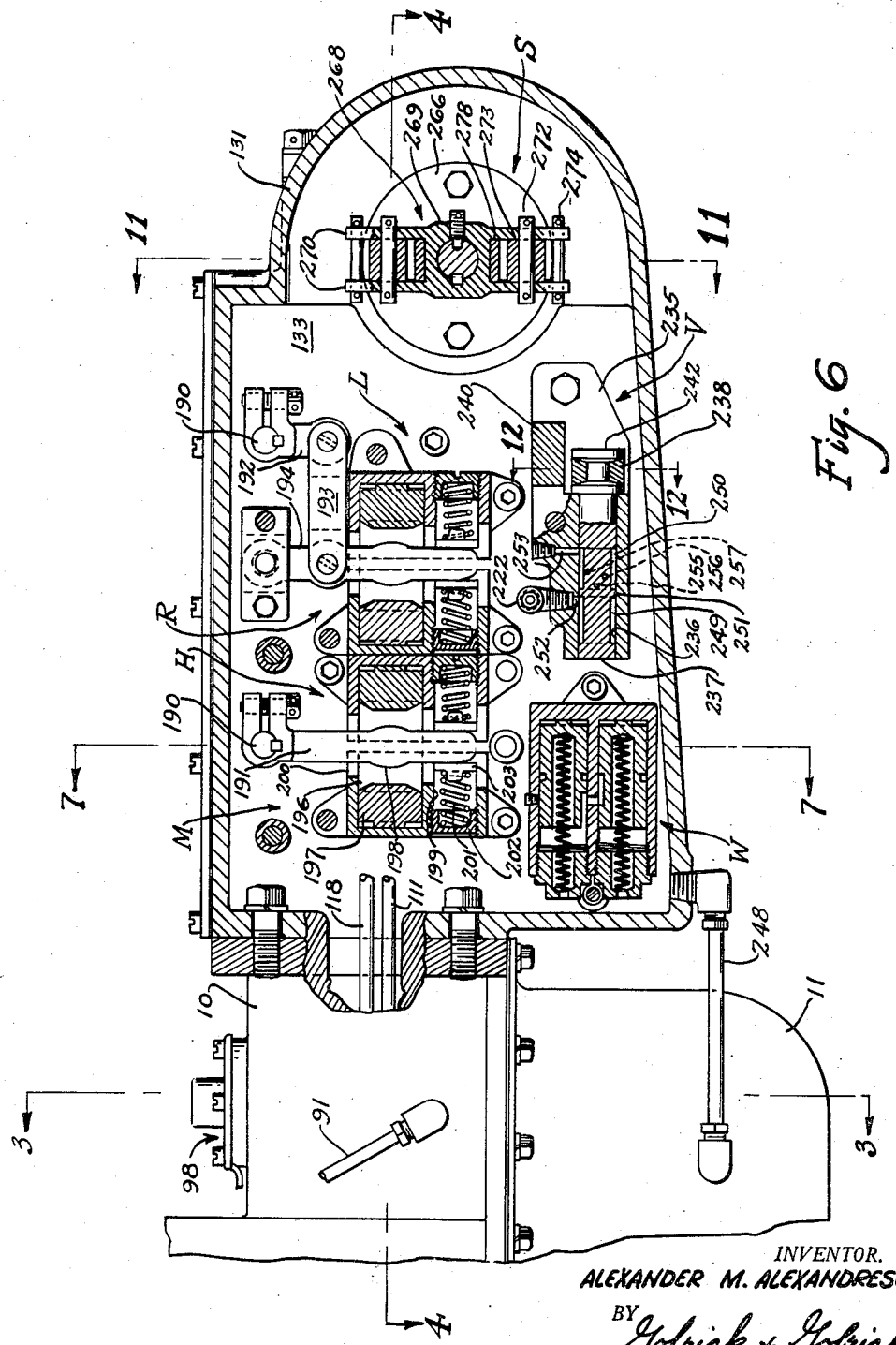
Fig. 6 is a vertical longitudinal section through certain control and valve elements for the transmission taken as indicated by the line 6—6 in Fig. 4.
Figure 16:
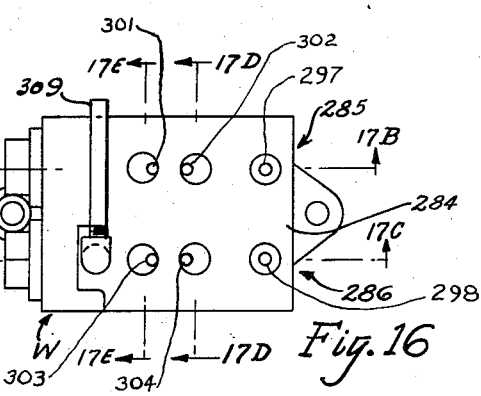
Fig. 16 is a vertical side elevation of the duplex relay valve of the control system appearing in vertical longitudinal section in Fig. 6.
Figure 17B:
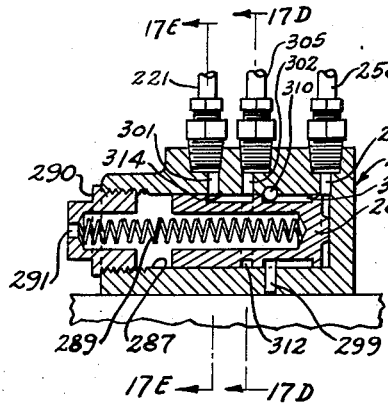
Fig. 17B is a horizontal axial section taken through the relay valve as indicated by the line 17B—17B in Figs. 16 and 17A.

The duplex relay valve W (see Figs. 6, 16, 17A, B, C,

D and E), the body 234 of which is bolted to the housing side wall in the control compartment, includes two cooperating valve assemblies 285 and 286, (upper and lower) comprised of an upper cylinder 287, piston 288, piston spring 289, cylinder plug 290 with vent 291; and of lower cylinder 292, piston 293, spring 294 and plug 295 with vent 296. The vents 291 and 296 vent air to and from the cylinder space and liquid leaking by the pistons to allow free piston movement. Spacer bosses on the piston heads provide access for operating fluid thereto, delivered from valve V to piston 288 by line 258 through pressure port 297 of cylinder 287 and to piston 293 by line 259 through pressure port 298 of cylinder 292. A guide pin 299 in each cylinder engages a short slot in the corresponding piston to keep the piston from turning.

A pair of axially spaced radial ports 301 and 302 opening into the cylinder of valve 285, and similarly spaced and located ports 303 and 304 opening into the cylinder of valve 286 are connected respectively by line 221—220 to the outlet port 217 of valve K, by line 305 to the port 204 of clutch cylinder L, by line 306 to the port 204 of clutch cylinder D, and by line 307 to port 204 of clutch cylinder M. A third port 308 axially spaced in valve 286 from port 303 opens through exhaust riser 309 as an air seal to the compartment. A vertical exhaust passage 310, drilled in the valve body nearly tangentially to cylinders 285, 286 and spaced from ports 302, 304 in an axial direction toward the pressure end of the cylinders, opens to the compartment space at the top of the valve body (see Fig. 7).

The mutual location and spacing of certain passages in the valve body and on the valve pistons are described in this paragraph with reference to the pistons when not displaced by fluid pressure. A circumferential groove 312 cut mid-length of piston 288 coincides with lateral port 303; lateral flat intersecting groove 312 provides a passage 314 running from port 301 to 302 and a second lateral flat 315 opens to exhaust passage 310; and a bottom flat 316 opening to the cylinder space at the end of piston 288 runs inwardly beyond the vertical passage 317 between the two cylinders. A top flat 318 intersecting groove 313 on piston 293 extends to 317 so that the clutch L is in communication through the valve W, ultimately vent 291, to the compartment space. On the piston 293 a lateral flat 320 forms a passage from port 303 to exhaust port 308; and a second lateral flat 321 on the other side of groove 313 opens to vertical exhaust passage 310. The lengths of the flats forming channels 315 and 321 are equal and similarly located so that they are both open to exhaust passage 310 in the body throughout the valve piston movement; similarly 314 and hence groove 312 is always open to port 301; so also 318 and hence groove 313, to passage 317; and 320 to exhaust port 308.

Further description of the relations of the duplex relay valve passages, parts and functions in changing the various fluid line connections will appear in the description of transmission operation.

*Operation*

The gear housing of the transmission box is supplied with the usual lubricant, and the fluid coupling and sump are filled with requisite amount of a suitable hydraulic fluid for the system. In preliminary adjustments of the transmission the hydraulic elements and lines may be bled of air by the usual procedures for such a system. However the pistons in the valves W and V, and in units L, M, H, and R may be fitted to the cylinders with such clearance that fluid leaks past the pistons enough to bleed air from the lines in initial operation of the transmission as well as during subsequent operation should any air adventitiously come into the lines. So also the piston in valve Q may be so fitted as to bleed line air as well as slight fluid leakage through valve Q to trough 19a. Such leakage is not objectionable since returned to the sump in all cases. Also the pistons in coupling clutch C permit some leakage into the coupling, so that air is bled from the clutch cylinders and the lines connected thereto.

The engine is started with valve K set through the driver's control lever to neutral (as in Fig. 14), the normal engine starting position, and the pump is then driven through the coupling casing to discharge to the pump through valve 87 even while the engine idles as soon as its pressure setting (usually 10 to 15 p. s. i.) is exceeded. If the accelerator is depressed, causing the solenoid valve J to open, fluid pumped to lines 110—111 is blocked by valve K. The pressure applied by the pump to lines 117—118 for the coupling clutch C is ineffective since valve Q is closed. Though the driven blade assembly in coupling A is rotating even at idling speeds, so that input shaft 20, countershaft 150 and the constantly meshing gears are rotating, the vehicle is not driven since the clutches CR, CL, CM and CH are not engaged.

For reverse drive, driving selector valve K is set to reverse position (about 40° counter-clockwise of Fig. 14 setting), and when the accelerator is depressed, opening valve J, fluid is directed by valve K through 218 to the reverse clutch cylinder causing the piston therein to move arm 194 against the opposed spring of actuating unit L. Consequently through linkage 193—192, the shipper mechanism assembly—comprised of clutches cylinder units L and R, rocker shaft 190, arms 188, dogs 189 and shipper ring 187—between the clutches CL and CR pushes the plunger 174 inward in clutch R to lock reverse gear 161 to the transmission output shaft and drive the vehicle. The movement of the piston in timing valve V caused by the centrifugal device S at high reverse speed has no effect on the relay valves W or Q, since no fluid pressure is supplied to line 220 due to setting of valve K, and consequently neither the clutch C in the coupling nor the remaining gear clutches come into operation.

Upon release of the accelerator, valve J closes when the solenoid is deenergized, putting the line 110—111 and therefore cylinder of clutch actuating unit R in communication with exhaust riser 107, allowing the restoring spring of unit L to move the arm 194 and the piston in R back to central position, the fluid displaced by the piston return being exhausted through riser 107 to the sump. The return of arm 194 causes the shipper assembly to return ring 187 to central position, and the return biasing springs 175 move plunger 174 out of engaged position in clutch CR, unlocking reverse gear 161 from the output shaft, so that reverse free wheeling ensues. Incidentally it may be noted that a quick change of the selector valve from either forward or reverse setting to neutral allows rapid release of fluid pressure from the lines 220, 221, 222 or the line 215 of the cylinder of unit R, through exhaust line 219 of valve K to facilitate disengagement of the several forward drive clutches or the reverse clutch.

For forward drive, driving selector valve K is set at forward drive position (clockwise of Fig. 14 by 40°), putting the pump, through lines 110—110, in communication with line 220 ready to supply fluid through line 221 to the duplex relay valve inlet port 301 (at upper valve 285) and through line 222 to the inlet port 252. Now before the accelerator is depressed (as also for any condition when K is not set to forward drive position), the pistons in the duplex relay valve W are biased to extreme right positions, termed "closed" or "off" positions, by the action of their springs, as in Fig. 17A, B, C, D, E. The fluid supply line 221 is connected by passage 314 in the upper valve 285 to line 305 (Fig. 17B), so that as soon as the accelerator is depressed and valve J closed, pressure is applied in the cylinder of clutch actuating unit L to move arm 194, and hence the associated shipper assembly (in direction opposite to that just described for reverse) to engage clutch CL.

Figure 17C:
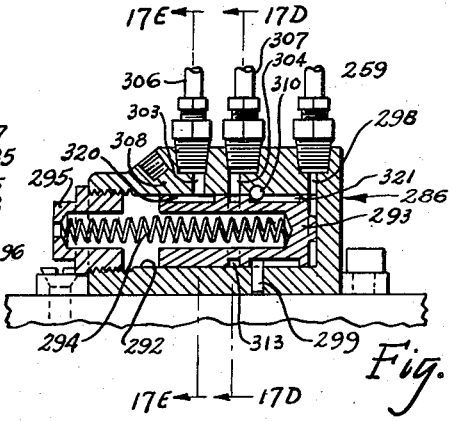
Fig. 17C is a horizontal axial section taken through the relay valve of Fig. 16 as indicated by the lines 17C—17C in Figs. 16 and 17A.
Figure 17E:
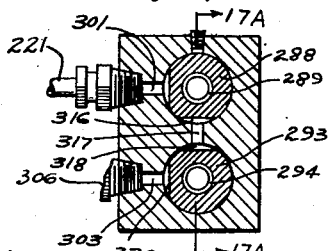
Fig. 17E is a vertical transverse section taken as indicated by the lines 17E—17E in Figs. 17B and 17C.
Figure 19D:
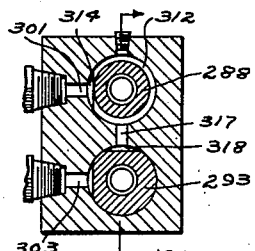
Fig. 19D is a vertical transverse section taken through the relay valve as indicated by the lines 19D—19D in Figs. 19A and 19B.

At this same off position of the relay valve, pistons, line 306 from the H clutch cylinder is connected by passage 320 in lower valve 286 (Fig. 17C) to exhaust riser 309. Line 307 from clutch cylinder M (Figs. 17A, D, E) is connected through groove 313 with intersecting top passage 318 in the lower valve through vertical passage 317 to the passage 316 in the upper valve, and therefore through the cylinder space to the upper valve exhaust vent 291.

After engagement of clutch CL to drive the vehicle, the centrifugal mechanism S comes into operation and begins to move the piston in valve V outward to the right from the stopped position of Fig. 6. Unless the piston flange 251 moves to position where at least outlet port 255 is opened to groove 249, and the line 222 to fluid pressure to the piston of valve 285, upon release of the accelerator, deenergization of the solenoid and closing of valve J, pressure to cylinder in unit L is released to allow disengagement of clutch CL and freewheeling, in manner similar to disengagement of clutch CR, fluid being expelled by a path through lines 305, valve 285, lines 221—220, valve K, lines 111—110, valve J and riser 107 to the sump.

Figure 19B:
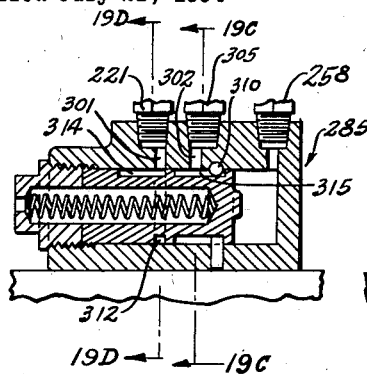
Fig. 19B is a horizontal transverse section taken as indicated by the line 19B—19B in Fig. 19A.
Figure 18B:
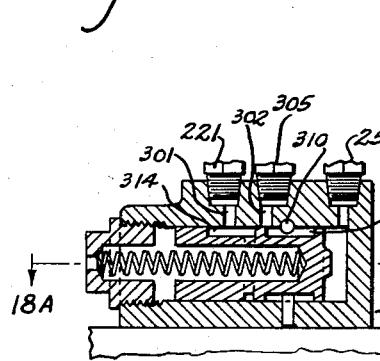
Fig. 18B is a horizontal transverse section through the relay valve taken as indicated by the line 18B—18B in Fig. 18A.

With continued forward acceleration, in low speed gear, say to 15 M. P. H. the mechanism S moves valve V to a position where piston flange 251 uncovers outlet port 255 and fluid from supply line 222 passes to line 258 to the piston head in upper valve 285 of W, moving the piston 288 to extreme left. However, in the course of this travel, it reaches a point (see Figs. 18A, B) where channel 314 is no longer open to port 202, but channel 315 is advanced to 202 to put line 305 in communication with exhaust passage 310 allowing release of fluid from unit L so that clutch L disengages, the passage 317 is cut off from channel 316 and momentarily the line 221 is blocked. Thus though the movement of the piston 288 to the extreme left position of Fig. 19A takes place quickly after V applies pressure in line 258, the clutch CL disengages before clutch CM engages.

When the upper valve 285 reaches extreme left position (Fig. 19B), groove 312 coincides with vertical passage 317 (Figs. 19A, D) to the lower valve, so that fluid from line 221 passes through channel 314, groove 312, passage 317, upper flat channel 318 and groove 313 of lower valve piston 293 to port 304 to apply pressure through line 307 (see Figs. 17C, 19B) to the cylinder of unit M. The piston in unit M therefore moves lever arm 191 against the opposed spring in unit H to shift the shipper ring of the shipper assembly between clutch CM and CH to engage clutch CM.

Were the accelerator to be released at this stage, closing valve J, the release of pressure and fluid in lines 221 and 222 through J and riser 107, by the path already noted, would allow CM to disengage for free wheeling. The pressure drop in line 258 would allow piston 285 to return to the right, opening passage 317 through the upper valve to vent 291 to vent any remaining pressure in unit M for certainty of disengagement of clutch CM. If driving is again resumed before vehicle speed drops so far as to cause V to close line 255 from line 222, the opening of valve J applies pressure in line 255 to move valve 285 again immediately to second or medium speed drive position (of Fig. 19B) and pressure in line 221 then is again directed by the duplex relay W to effect engagement of clutch CM as before.

Figure 20B:
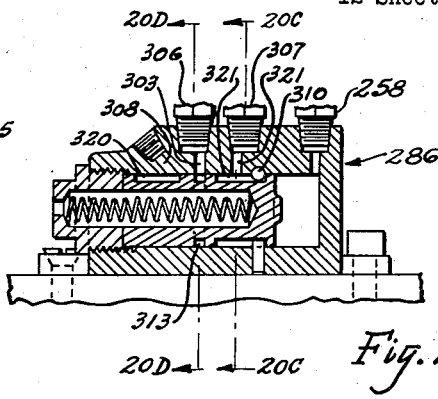
Fig. 20B is a horizontal transverse section taken through the relay valve as indicated by the line 20B—20B in Fig. 20A.
Figure 20D:
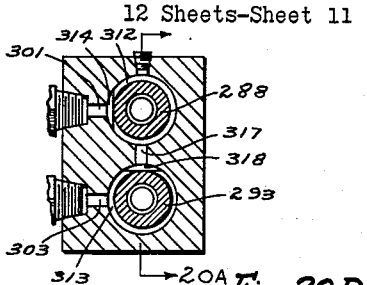
Fig. 20D is a vertical transverse section taken through the relay valve as indicated by the line 20D—20D in Figs. 20A and 20B.
Figure 17D:
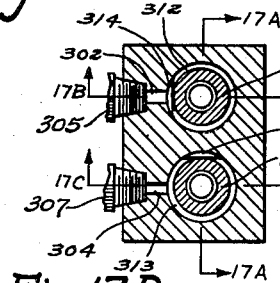
Fig. 17D is a vertical transverse section taken through the relay valve as indicated by the line 17D—17D in Figs. 17B-17C.
Figure 19C:
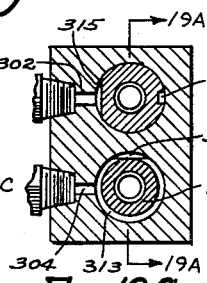
Fig. 19C is a vertical transverse section taken through the relay valve as indicated by the line 19C—19C in Figs. 19A and 19B.
Figure 20C:
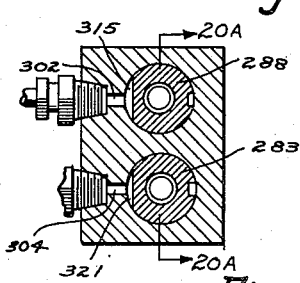
Fig. 20C is a vertical transverse section relay valve taken as indicated by the line 20C—20C in Figs. 20A and 20B.

With continued acceleration on second speed, the piston of valve V, say at 25 M. P. H., is advanced by S to a point where pressure is admitted from 222 through port 256 to line 259 to the piston of valve 286, as well as through 258 to 285, causing 286 to move quickly to left position of Figs. 20A, B, C, D where groove 313 coincides with passage 317 and port 303 for engagement of clutch CH. However in moving toward such position, flat channel 321 puts line 307 of unit M through port 304 in communication with the exhaust passage 310 to release fluid pressure for disengagement of clutch CM (Fig. 20B) and with the high speed position reached (see Fig. 20D particularly) fluid from line 221—by a path through port 301 and groove 312 of the upper valve, passage 317, and groove 313 and port 303 in the lower valve to line 306—is delivered to the cylinder of unit H to engage clutch CH by moving arm 191 in opposite manner to that effecting engagement of CM. As in the previous cases, the piston of the opposed unit may serve as a stop for movement of the lever arm by one unit.

Upon release of the accelerator pedal, and closing of valve J with fluid pressure release from lines 221 and 222 to riser 107 as previously noted, clutch CH disengages for free wheeling. The pressure drop in lines 258 and 259 allows the piston springs to return both members 285 and 286 to off position, to facilitate disengagement not only by drop of pressure in the supply line 221 in communication with unit H, but particularly by the rapid shift of 286 opening line 306 of unit H through port 303, lateral flat channel 320 and port 308 to exhaust riser 309. If driving is resumed before setting of valve V retrogresses by drop in vehicle speed, upon opening of valve J by the accelerator action, the pressure applied again in lines 258, 259 immediately restores the valve settings in W to that of Fig. 20A so that the pressure in line 221 is immediately applied to engage clutch CH without engagement of lower speed clutches. In the event that vehicle speed has dropped to a point where valve V has returned to a lower speed position, then upon resumption of driving by depressing the accelerator, the preceding sequences are again repeated.

Where the vehicle is accelerated further say above 35 M. P. H. after engagement of clutch CH for third or high gear, the piston valve V is moved to its extreme right position (limited by the stop action of pins 274 restraining further movement of the weights 271 in mechanism S) where the third outlet port 257 and line 118 are also put into communication with pressure line 222. The pressure in line 118 moves the piston 114 in coupling clutch relay valve Q to the left in the drawings, thereby admitting fluid—already present in the circumferential channel 109 around bearing 18 since valve J is open—through inlet port 123, piston channel 125 and outlet port 122 of valve Q to the second groove 119 about bearing 118, whence it is applied through the previously described bearing and shaft passages to the cylinders of coupling clutch C to engage the latter. Though the coupling is of high efficiency with relatively little high speed slip, say 5% the engagement of the clutch reduces the slip to zero. The fluid initially displaced in the coupling by the expansion of the clutch pistons, as well as thermal expansion displacement, may escape through the spring biased ball check valve 42 to the trough 19a.

Again when the accelerator is released closing J, not only does clutch CH disengage for free-wheeling as previously described but release of pressure in line 117 through J to 107 allows coupling clutch C to slip, the release of the clutch being facilitated by opening of Q, that is movement of the piston 114 to the right, opening line 125 through vent 126 to trough 19a. Upon release of pressure to coupling clutch C, the clutch shoes slide on the clutch drum, the attendant frictional forces being quite low due to lack of hydraulic pressure to apply any marked normal force, and due to lubrication of the clutch surfaces by hydraulic fluid, for which ready access provided by transverse grooves in the faces of the shoes. On application of further fluid pressure to clutch C, no outward piston displacement therefore occurs but increased normal force results for clutching. Piston leakage during engagement of clutch C escapes through valve 52 to trough 19a. If the vehicle speed has not dropped below the point where S holds valve V open to apply pressure to Q, when the accelerator is again depressed to open J by energizing solenoid 98, the pressure applied to move the pistons in the valves 285, 286, and Q immediately causes an engagement of clutches CH and C. Otherwise one of the clutches CL, CM, CH engages at some lower point dependent upon the position of valve V in the stages of forward drive and works on up the cycle described.

Hitherto operation has been described in terms of "off-on" use of the accelerator pedal. However, if the vehicle slows down under additional load as in ascending an incline, while the accelerator is depressed and hence valve J open, the mechanism S in slowing down, of course, moves the piston 237 to the left in time valve V. Assuming gradual deceleration under load with accelerator still depressed, say from above 35 M. P. H. where clutch CH was engaged to clutch transmission input and output shafts 20 and 136 directly, and where the coupling clutch C is engaged, the ports 257, 256, 255 in V will be successively cut off from inlet port 252 and pressure of line 222, and opened to exhaust port 253 and riser exhaust line 245 which lubricates the linkage to S. In other words, the control pressure lines 118 to valve Q, 259 to lower valve 286 of W, and 258 to upper valve 285 of W will be vented successively to allow the valves Q, 286 and 285 to move, in that order, to their off positions, although fluid is still supplied in lines 117, 221 and 222.

Valve Q then connects the passages for the cylinders of coupling clutch C to the exhaust vent 126 allowing C to disengage, for some torque multiplying action in coupling A, but as the setting of Fig. 20A still obtains in W, clutch CH remains engaged. As the piston in 286 is returning quickly to off position, its top flat channel is open to the fluid supply delivered through the upper valve from line 221 to passage 317, but the groove 313 moves away from port 303 cutting off pressure thereto, while lateral flat channel 320 connects port 303 to port 308 and hence clutch cylinder H through line 306 to exhaust riser 309, permitting clutch CH to disengage. When 286 is at off position, then the condition of Fig. 19A results, and as previously described, fluid is applied in unit M to engage clutch CM. When valve 285 closes to give the original condition of Fig. 17A for engagement of clutch CL, it too passes an intermediate point for cutting off fluid pressure of line 221 from the cylinder of unit M and venting the unit for disengagement before CL engages, the position being like to that of Figs. 18A and B, where line 307 of M is vented through port 304, groove 313 and top flat 318 of the lower valve, passage 317, and bottom flat 316 and vent 291 of the upper valve. Thereafter when groove 312 of the upper valve coincides with port 302 (Fig. 17A), pressure from line 221 is admitted by flat channel 314 at port 301 through 302 and line 304 to cylinder L to engage clutch CL.

The retrogression of the transmission, through inverse gear change steps back to low speed gear, was premised on a continuing heavy load, demanding ultimately the lowest gear speed setting; i. e., highest torque setting of the transmission for a given setting of the accelerator. Of course such retrogression might take place but part way as where an incline flattened out or the load lightened, or where additional engine power was used, so that the vehicle would pick up speed, and then through the control of S over V take the transmission to higher speed settings.

At any given speed, the accelerator pedal may be partially released to a position where switch 128 is still closed so that the valve J is kept open although the pedal setting is near idle power position. Then as the engine is still coupled to the transmission output shaft, engine braking rather than free wheeling will ensue. If such condition is maintained, the inverse gear changes just described will occur the retrogression being terminated by resumption of driving power, as will be the case where the independent panel switch 129 is used.

*Modification*

Figure 25:
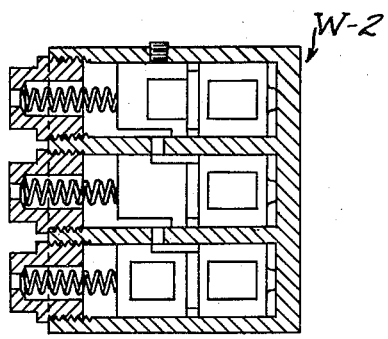
Fig. 25 is a vertical section through the relay valve of Fig. 24.
Figure 24:
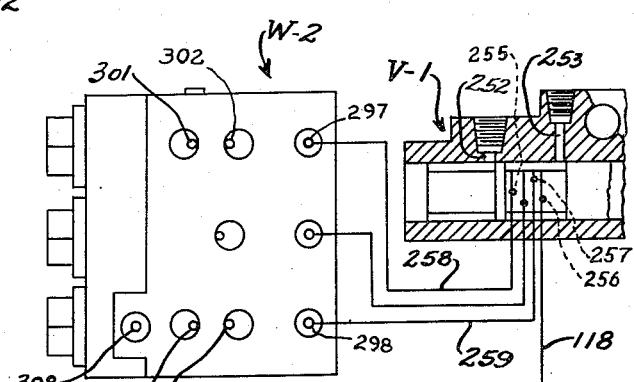
Fig. 24 is a semi-schematic representation of a triple piston relay valve in side elevation, a shift control valve in fragmentary section and the fluid lines therebetween for use in a transmission having a reverse and four forward speed clutch units.
Figure 5:
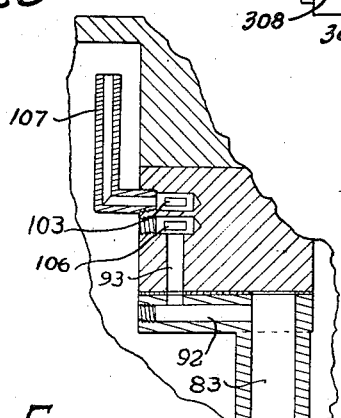
Fig. 5 is a fragmentary vertical sectional view taken as indicated by the line 5—5 in Fig. 4.

Obviously where more or fewer speeds are desired in forward or reverse, the gear box unit may be modified by using a countershaft with the requisite additional gear formations, corresponding gears meshing therewith rotatable on the output shaft, and ball clutches and actuating units therefor. Where an odd number of clutches result, the odd actuating unit piston has opposed to it on the other side of the shipper lever arm a return spring such as would be provided by an opposed actuating unit of the character previously described. Of course, the control valve V and relay valve W, as the speed responsive control means, would be modified.

Where one reverse and four forward speeds are desired, a triplex relay valve would be used in place of W, and timer valve V would be modified by adding an additional controlled outlet port for controlling the extra piston in the triplex valve, the triplex and timer valves W-1 and V-1 being connected in a manner similar to that of the previous form as shown in Fig. 24, the remaining connections of the transmission system being the same. The vertical longitudinal section of the triplex relay shows the top and bottom valves to be the same as 285 and 286 in valve V, and their line connections to V and the hydraulic lines to be identical. The middle valve, required because of the extra gear, is similar to the bottom valve 286 in its relation to the valve above, and similar to 285 in respect to the valve below in providing an exhaust vent therefor. The sequence of valve change operations would be the same, the middle valve serving to control the engagement and disengagement of the extra ball clutch. The spring 279 in mechanism S might in this case be prestressed so that valve V-1 would open successive control ports at speeds of say 10, 20, 30 and 40 M. P. H. for actuation of the second, third and fourth speed ball clutches and finally the coupling clutch.

Where but a low, a high and a reverse speed are desired, the transmission is considerably simplified not only by the omission of a gear surface from the counter-shaft, a ball clutch and gear from the output shaft, and a clutch actuating unit; but also by modifying the speed responsive valve means for controlling forward drive. Such a modification is shown in Fig. 21, a section through the control compartment similar to Fig. 6, wherein like reference characters are used to designate elements similar to those of the first form. The actuating unit L is in opposed relation to the unit H as was unit M in the first form. The unit R-1 of course omits the underlying restoring spring, and a spring in housing 490 is opposed thereto on the other side of the lever arm 494. The operation in reverse is identical with the first form. The relations of the hydraulic components is shown by the schematic diagram in Fig. 25, the electrical circuit being the same as in Fig. 13.

The speed responsive timing device includes a centrifugal mechanism S linked to the speed responsive valve means V-2 which here is modified to incorporate in one time valve the functions of the prior valve V and relay valve W, the lever linkage and its lubrication system being the same. The body 435 of valve V-2, mounted similarly to V, has three axially spaced top ports opening to the horizontal cylinder bore 436, an exhaust port 453 to exhaust line 245, an inlet port 452 connected by supply line 220 to the forward drive port 217 of valve K, and a second exhaust port 410 opening to the control compartment space. The valve piston member 437 is similar to 237, but has three similar circumferential grooves or channels 448, 449 and 450 separated by flanges 447 and 451. The ports 410, 452, 453 open to the right ends respectively of channels 448, 449 and 450, when the piston is at its innermost or idle position. The controlled ports, located in the side of the body 435 to provide space for threaded connections of the various lines, are port 460 spaced somewhat to the right of flange 447 and connected by line 305 to the cylinder of unit L, port 461 spaced a like distance from flange 451 and connected by line 306 to the cylinder of unit H, and port 462 spaced a little further to the right of 461 and connected by line 118 to the cylinder of coupling clutch relay valve Q.

For convenience, the location of these ports has been described with reference to the innermost position of the piston 437, and it will be noted from the description and drawings, that with the piston at such position, line 220 is connected to line 305 to cylinder L through port 460, channel 449 and port 452, to apply fluid pressure for engagement of L; while line 306 in the cylinder in unit H, and line 118 for control pressure to relay valve Q are connected through channel 450 to port 453 and exhaust line 245. Hence when the accelerator is depressed, opening valve J, fluid is directed from 220 by valve V-2 to cylinder L to engage clutch CL. As in first form, release of the accelerator vents 220 through riser 107 releasing clutch cylinder pressure to disengage CL for free wheeling.

With continued acceleration, however, the valve V-2 is moved by S to the right to a point where flange 447 blocks port 460, and L cylinder line 305 from port 452 and fluid supply line 220, while the latter port and line are put in communication with port 461 and line 306 to the cylinder H through channel 449. At the same time, port 460 and line 305 to cylinder L are connected through channel 448 to exhaust port 410 so that at the same time pressure in cylinder H is applied, cylinder L is vented to cause arm 191 to swing and through the shipper assembly between clutches CH and CL cause clutch CL to release and clutch CH to engage. With release of the accelerator pedal, the valve J closes off pressure to valve K, line 220 and vents the latter to 107 as in previous cases, allowing the clutch CH to disengage for free wheeling.

On the other hand with continued acceleration, valve V-2 moves to extreme right position, where not only do the conditions of valve connections prevail as for high speed, but also port 462 with connected line 118 of valve Q are connected through channel 449 to line 220, thereby applying pressure to open valve Q and engage the coupling clutch as in previous forms. By release of the accelerator, closing valve J, again 220 is vented to riser 107, and the pressure drop allows valve Q to close, disengaging coupling clutch C, and the drop in 220 allows the spring in unit L to move arm 191 to disengage clutch CH for free wheeling. When driving power is reapplied by depressing the accelerator, valve J again opens to supply pressure to V-2, and the clutch CL, the clutch CH, or clutches CH and C will again engage depending upon the setting of V-2 that the vehicle speed through S has determined.

Where the vehicle is slowing down under load with accelerator depressed and J open, say from condition where both CH and C are engaged, the piston of V-2 is moved inward by the spring biased mechanism S, so that as port 462 and line 118 are put in communication with exhaust line 245, valve Q opens to disengage coupling clutch C. Then port 461 and line 306 are also vented through 245 releasing clutch CH at the same time that line 305 to clutch CL is connected to line 220 through 449 to cause clutch CH to disengage and CL to engage.

Figure 26:
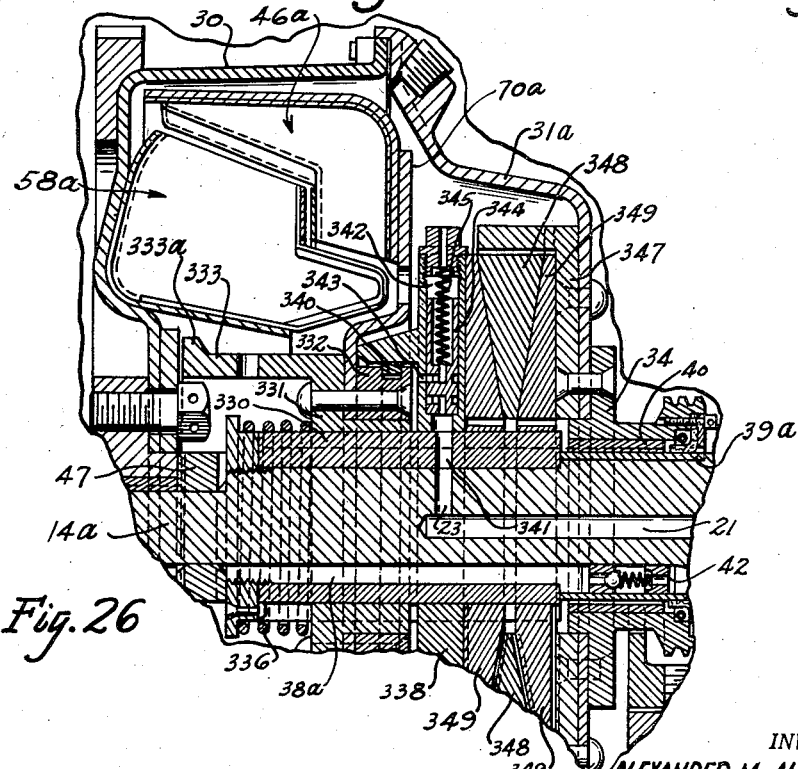
Fig. 26 is a second form of fluid coupling and clutch.

In Fig. 26, wherein elements like to those of previously described forms are designated by similar reference characters, a wide-blade form single impeller assembly 58a is secured to the coupling forward casing wall 30. A male splined sleeve 330 keyed to the coupling output shaft 14a carries an axially shiftable female splined hub 331 to a rearwardly facing shoulder of which the forwardly offset central portion of the disk 70a in the driven rotor or turbine unit 46a and a circumferentially grooved annular clutch piston 332 are co-axially riveted. An annular extension 333 of the hub, radially perforated for fluid flow, projects toward central reinforcing of the forewall, the widened end surface 333a being disposed about the casing fastening bolts in proximity to the reenforcing plate. As usual a thrust bearing 47 is interposed on the reduced shaft end between the crank-shaft or casing and forward shoulder of shaft 14a. A flanged nut 334, threaded on the end shoulder and locked against rotation by a pin and slot 335, provides a reaction surface for compression spring 336 bearing against the hub 333 to bias it rearwardly. A slot 38a in shaft 14a runs from the radially grooved thrust bearing 47 beyond the collar 34 of rear casing number 31a to permit fluid to be expelled from the coupling casing through a clutch valve 42 as in the structure of Fig. 1. Sleeve 39a on the shaft, journalled in the bearing 40 with longitudinal lubricating slots, abuts against the end of sleeve 330.

The front face of a female splined clutch cylinder plate 338 on sleeve 330 is provided with an annular flange 339 projecting into the offset of the rotor disk 70a, forming a cylinder to which piston 332 is sealed by ring 340, which permits some slight fluid leakage from the cylinder to replace fluid in the coupling. The axial fluid channel 21 in the shaft 14a opens through the radial shaft channel 23, aligned radial channel 341 in sleeve 330 to the inner end of the cylinder 342 of a radially disposed piston type valve in the disk 338 having a port 343 opening into the clutch cylinder. The valve piston 344, biased inwardly to an end shoulder by compression spring 345 interposed between the recessed opposed ends of the valve piston and axially apertured threaded cap or plug 346, is provided near its inner end with outer and inner circumferential grooves opening through corresponding radial apertures respectively to the outer and inner ends of the piston. Thus when no pressure is applied in the axial shaft channel 21, the valve piston 334 is in the position shown with the outer groove coincident with port 343 venting the clutch cylinder through the valve to the interior of the coupling casing; while with pressure applied in the axial channel 21, the valve piston 334 is moved outwardly against cap 346 cutting off the port 343 from the casing, and putting the inner groove in coincidence with port 343 to admit fluid from axial passage 21 to the cylinder to apply a clutch engaging force.

Centrally apertured driving and driven coupling clutch members are interposed between the rear coupling casing member 31a and the cylinder plate 338, namely an annularly flanged disk 347 riveted to the rear wall of the housing as a driving member, a pair of hard metal disks 349 as driven members having inner coniform faces and outer flat faces and slideably splined to the shaft, and a softer metal disk 348 as a second driving member interposed between the hard members with radial lugs or splines engaged in end slots in the flange or disk 347.

The faces of center member 348 are shaped complementarily to the adjacent faces of members 349, and the several coniform and flat faces of all are grooved outwardly for access of fluid as a lubricant. Apertures formed near the center of disks 349 in alignment with the spacing of member 348 vent the plates and permit free fluid access to bearing 40.

The remainder of the transmission structure may be the same as in those previously described, for example, that form with two gears in forward drive and the hydraulic control system there described, or the three forward drive speed form. The coupling clutch just described merely takes the place of the previously described coupling clutch form in function during the gear speed changes.

When pressure is applied to the clutch valve from channel 21 under the control of relay valve Q, the clutch cylinder plate 338 is urged rearwardly toward the flanged disk 347 to compress the members 348, 349 therebetween into driving engagement, so that torque is transmitted from the coupling casing, driving plates 347, 348 and driven plates 349, sleeve 330 to the output shaft. The piston 332 and hence hub 331 is urged toward the front casing wall and full clutch engagement is obtained when the hub portion 333a comes to bear on the wall. Fluid displaced from the coupling is vented through the valve 42.

However the previously occurring transmission of torque through the fluid coupling impeller and rotor results in a normal force between the opposed spline faces of the hub 331 and sleeve 330 thereby developing a frictional force between the splines, in addition to the force of spring 336 resisting sliding of the hub. Thus as the pressure increases in the clutch cylinder, an increasing force is applied to the clutch plates thereby increasing torque transmission through the clutch until full direct driving by the clutch is obtained.

Upon release by relay valve Q of pressure in the axial passage 21, valve piston 344 is forced in by spring 345 to vent the clutch cylinder through the clutch valve and relieve the direct driving clutch engaging force.

I claim:

1. For connecting the crankshaft or the like of a prime mover having power controls to an output shaft, an automatic hydraulic transmission system comprising: a fluid coupling unit having impeller means driven by said crankshaft, rotor means including a driven shaft, and a hydraulically engaged coupling clutch including a driving clutch member driven by said crankshaft, a driven clutch member secured to the coupling driven shaft to rotate therewith, and hydraulic cylinder and piston means to engage said coupling clutch members; a gear change unit including a housing, an input gear member journalled in the housing and driven by the coupling driven shaft, a countershaft mounted in said housing having a plurality of gear formations thereon with a first formation in constant mesh with said input gear member, a splined output shaft journalled in said housing, gear members rotatably mounted on the output shaft as part of a constantly meshed gear trains including others of said gear formations, one of said trains being a reverse gear train and the others for forward speeds, a plurality of ball clutch units, each clutch unit having a corresponding driven element splined to the output shaft and a driving element and a plurality of clutch balls and an axially shiftable clutch actuating plunger cylinder, one of said clutch elements having a cylindrical flange provided with a circumferentially spaced series of radial apertures serving as a ball carrier and the other element having radially adjacent to one side of said flange a cylindrical surface provided with at least one circumferentially spaced series of recesses corresponding in number to said apertures, said plunger having a circumferential ball camming surface disposed on the other side of said flange to cam said balls into locking engagement with said recesses for clutch engagement at one axial position and release the balls for clutch disengagement at a second position, and means biasing the plunger to disengaged position, the driving element of one of the ball clutches being fixed to said input gear element to provide a direct speed clutch and the driving elements of the remaining ball clutches being fixed to corresponding said gear members to provide clutches for other speeds; actuating means for each ball clutch including a hydraulic piston-cylinder unit, means for applying the force of the piston-cylinder unit to the plunger of the corresponding ball clutch for moving the plunger to engaged position, and a restoring spring acting through the last said means in a direction opposite to the piston-cylinder unit to restore the plunger to disengaged position; a hydraulic fluid sump and a continuously driven pump drawing fluid from said sump; speed responsive valve means coupled to said output shaft and responsive to the speed thereof whereby fluid from said pump may be applied successively and individually to the ball clutches for forward speeds from the lowest speed to highest speed clutch of the gear unit and finally to the coupling clutch while the highest speed ball clutch is engaged as the output shaft attains predetermined successively higher speeds; and primary valve means linked with the power controls of the prime mover including a valve member set to an off and on position when the prime mover controls are set for idling and running conditions to connect the speed responsive valve means to the outlet of the pump and to the sump respectively.

2. A transmission as described in claim 1 including a control system comprising, in combination with said speed responsive valve means and said primary valve means, a direction driving control valve; said primary valve means having a controlled outlet port, an inlet port connected to the pump outlet, an exhaust port to the sump, and a valve member adapted at an on position to open the inlet port to the outlet port and at an off position to close the inlet port and open the outlet port to the exhaust port; said driving direction control valve receiving fluid from the controlled outlet of the first valve adapted at a neutral setting to direct fluid to the sump, at reverse setting to the actuating means effecting the reverse speed setting, and at a forward speed setting to the speed responsive valve means; and said speed responsive valve means including a movable valve element controlling at various positions the flow of fluid from the direction control valve to the actuating means effecting forward speed ratio settings and to the coupling clutch, and including governor type centrifugal means driven by said output shaft and coupled to said valve element for positioning the valve element in response to output shaft speed.

3. A transmission as described in claim 1, including a control system comprising in combination with said speed responsive valve means and said primary valve means, a driving direction control valve; said primary valve means having controlled outlet port, an inlet port connected to the pump outlet, an exhaust port to the sump, and a valve member adapted at an on position to open the inlet port to the outlet port and at an off position to close the inlet port and open the outlet port to the exhaust port; said driving direction control valve receiving fluid from the controlled outlet of the first valve adapted at a neutral setting to direct fluid to the sump, at reverse setting to the actuating means effecting the reverse speed setting, and at a forward speed setting to the speed responsive valve means; and said speed responsive valve means including a multiplex relay valve having valve sections controlled by fluid pressure and controlling at various settings the flow of fluid from the direction control valve to the actuating means effecting forward speed ratio settings, a single section relay valve controlling fluid from the pump to coupling clutch, a movable valve element controlling at various positions the application to the relay valve sections of control fluid pressure from the direction control valve, and governor type centrifugal means driven by said output shaft and coupled to said valve element for positioning said valve element in response to output shaft speed.

4. A transmission as described in claim 3, wherein said multiplex relay valve includes a valve body with cylinder bores one less than the number of said devices, a valve piston in each bore forming therewith a valve section, the piston being spring biased to a closed position, and an actuating pressure port into each cylinder whereby control fluid may be admitted to move the piston toward an open position, a first one of said section having a primary fluid inlet receiving fluid from said source, a controlled port to the actuator of a first device, each section having a controlled outlet port to a separate one of the actuating means for forward speeds and an exhaust port, said assemblies and pistons having fluid channels whereby as the pistons are moved successively and cumulatively to open positions fluid is directed by each assembly to successive individual actuating means and whereby the fluid from each actuating means is released to an exhaust port before admission of fluid to subsequent actuating means; and wherein said movable valve element is the piston member of piston type valve with an exhaust outlet, an inlet port connected to said source, and a series of spaced control ports each communicating with the actuating pressure port of corresponding valve sections of the relay valves, said piston member being adapted in closed position to place all the control ports in communication with the exhaust outlet for release of the relay valve pistons and at progressive open positions successively and cumulatively in communication with the inlet port to move the relay valve pistons to open positions; and a governor type spring biased centrifugal device driven by said output shaft and coupled with said piston member whereby the position of the piston member is determined in response to the speed of said shaft.

5. For connecting to an output shaft the crankshaft or the like of a prime mover having power controls, an automatic speed responsive hydraulically actuated transmission system comprising: a fluid coupling having an input element driven by the crankshaft and a torque output element; a gear speed change unit interposed between said torque output element and said output shaft adapted to be set for a plurality of speed ratios in one direction and at least one speed ratio in the reverse direction, said speed change unit including individual hydraulic piston-cylinder actuators for effecting the setting to each speed ratio; a hydraulic fluid sump; a continuously driven pump with inlet drawing fluid from the sump and an outlet; a first valve having controlled outlet port, an inlet port connected to the pump outlet, an exhaust port to the sump, and a valve member adapted at an on position to open the inlet port to the outlet port and at an off position to close the inlet port and open the outlet port to the exhaust port; means connected with the power controls and said valve whereby the valve is set to an off or on position when the power controls are set for an idling or driving condition of the prime mover; a driving direction control valve receiving fluid from the controlled outlet of the first valve adapted at a neutral setting to direct fluid to the sump, at reverse setting to the actuator effecting the reverse speed setting, and at a forward speed setting to the hereinafter named speed responsive valve means; and speed responsive valve means including a multiplex relay valve having valve sections controlled by fluid pressure and controlling at various settings the flow of fluid from the direction control valve to the actuators effecting forward speed ratio settings, a movable valve element controlling at various positions the application to the relay valve sections of control fluid pressure from the direction control valve, and governor type centrifugal means driven by said output shaft and coupled to said valve element for positioning said valve element in response to output shaft speed.

6. For connecting to an output shaft the crankshaft or the like of a prime mover having power controls, an automatic speed responsive hydraulically actuated transmission system comprising: a fluid coupling having an input element driven by the crankshaft and a torque output element; a gear speed change unit interposed between said torque output element and said output shaft adapted to be set for a plurality of speed ratios in at least one direction, said speed change unit including individual hydraulic piston-cylinder actuators for effecting the setting to each speed ratio; a hydraulic fluid sump; a continuously driven pump with inlet drawing fluid from the sump and an outlet; a first valve having controlled outlet port, an inlet port connected to the pump outlet, an exhaust port to the sump, and a valve member adapted at an on position to open the inlet port to the outlet port and at an off position to close the inlet port and open the outlet port to the exhaust port; means connected with the power controls and said valve whereby the valve is set to an off or on position when the power controls are set for an idling or driving condition of the prime mover; a driving direction control valve receiving fluid from the controlled outlet of the first valve adapted at a neutral setting to direct fluid to the sump, and at a forward speed setting to the hereinafter named speed responsive valve means; and speed responsive valve means including a multiplex relay valve having valve sections controlled by fluid pressure and controlling at various settings the flow of fluid from the direction control valve to the actuators effecting the speed ratio settings, a movable valve element controlling at various positions the application to the relay valve sections of control fluid pressure from the direction control valve, and governor type centrifugal means driven by said output shaft and coupled to said valve element for positioning said valve element in response to output shaft speed.

7. For connecting to an output shaft the crankshaft or the like of a prime mover having power controls, an automatic speed responsive hydraulically actuated transmission system comprising: a fluid coupling having an input element driven by the crankshaft and a torque output element; a gear speed change unit interposed between said torque output element and said output shaft adapted to be set for a plurality of speed ratios in one direction and at least one speed ratio in the reverse direction, said speed change unit including individual hydraulic piston-cylinder actuators for effecting the setting to each speed ratio; a hydraulic fluid sump; a continuously driven pump with inlet drawing fluid from the sump and an outlet; a driving direction control valve receiving fluid from the outlet of the pump and adapted at a neutral setting to direct fluid to the sump, at reverse setting to the actuator effecting the reverse speed seting, and at a forward speed setting to the hereinafter named speed responsive valve means; and speed responsive valve means including a multiplex relay valve having valve sections controlled by fluid pressure and controlling at various settings the flow of fluid from the direction control valve to the actuators effecting forward speed ratio settings, a movable valve element controlling at various positions the application to the relay valve sections of control fluid pressure from the direction control valve, and governor type centrifugal means driven by said output shaft and coupled to said valve element for positioning said valve element in response to output shaft speed.

8. A speed responsive control system for controlling and successively and individually setting a plurality of devices in response to a shaft speed, comprising: a hydraulic piston-cylinder actuator for each said device; a source of hydraulic fluid pressure; a multiplex relay valve including a valve body with cylinder bores one less than the number of said devices, a valve piston in each bore forming therewith a valve assembly, the piston being spring biased to a closed position, and an actuating pressure port into each cylinder whereby fluid may be admitted to move the piston toward an open position, a first one of said assemblies having a primary fluid inlet receiving fluid from said source, a controlled port to the actuator of a first device, each assembly having a controlled outlet port to a separate one of said actuators and an exhaust port, said assemblies and pistons having fluid channels whereby as the pistons are moved successively and cumulatively to open positions fluid is directed by each assembly to successive individual actuators and whereby the fluid from each actuator is released to an exhaust port before admission of fluid to a subsequent actuator; a piston type valve with an exhaust outlet, an inlet port connected to said source, a series of spaced control ports each communicating with the actuating pressure port of a corresponding valve assembly of the relay valve, and a piston member adapted in closed position to place all the control ports in communication with the exhaust outlet for release of the relay valve pistons and at progressive open positions successively and cumulatively in communication with the inlet port to move the relay valve pistons to open positions; and a governor type spring biased centrifugal device driven by said output shaft and coupled with said piston member whereby the position of the piston member is determined in response to the speed of said shaft.

9. A system as described in claim 8, wherein said centrifugal device includes means for adjusting the spring bias for varying the speed response of the piston type valve.

10. For connecting the crankshaft or the like of a prime mover to an output shaft, an automatic hydraulic transmission system comprising: a fluid coupling unit having impeller means driven by said crankshaft; rotor means including a coupling driven shaft; a gear change unit including a housing, an input gear member journalled in the housing and driven by said coupling driven shaft, a countershaft mounted in said housing having a plurality of gear formations thereon with a first formation in constant mesh with said input gear member, a splined output shaft journalled in said housing, at least one gear member rotatably mounted on the output shaft as part of a constantly meshed gear train including a second of said gear formations, a plurality of ball clutch units each clutch unit including a corresponding driven element splined to the output shaft and a driving element and a plurality of clutch balls and an axially shiftable clutch actuating plunger cylinder, one of said clutch elements having a cylindrical flange provided with a circumferentially spaced series of radial apertures serving as a ball carrier and the other element having radially adjacent to one side of said flange a cylindrical surface provided with at least one circumferentially spaced series of recesses corresponding in number to said apertures, said plunger having a circumferential ball camming surface disposed on the other side of said flange to cam said balls into locking engagement with said recesses for clutch engagement at one axial position and release the balls for clutch disengagement at a second position, and means biasing the plunger to disengaged position, the driving element of one of the ball clutches being fixed to said input gear element to provide a direct speed clutch and the driving element of a second one of the ball clutches being fixed to said gear member to provide a clutch for another speed; actuating means for each ball clutch including a hydraulic piston-cylinder unit means for applying the force of the piston-cylinder unit to the plunger of the corresponding ball clutch for moving the plunger to engaged position, and a restoring spring acting through the last said means in a direction opposite to the piston-cylinder unit to restore the plunger to disengaged position; a hydraulic fluid sump and a pump continuously driven by said prime mover drawing fluid from said sump; speed responsive valve means coupled to said output shaft and responsive to the speed thereof, whereby fluid from said pump may be applied successively and individually to the ball clutches from the lowest speed to highest speed clutch of the gear unit as the output shaft attains predetermined successively higher speeds; and valve means linked with the power controls of the prime mover including a valve member set to an off and on position when the prime mover controls are set for idling and running conditions for connecting said speed responsive valve means to the outlet of the pump and to the sump respectively.

11. For connecting to an output shaft the crankshaft or the like of a prime mover having power controls an automatic speed responsive hydraulically actuated transmission system comprising: a fluid coupling having an input element driven by the crankshaft and a torque output element; a gear speed change unit interposed between said torque output element and said output shaft adapted to be set for a plurality of speed ratios in one direction and at least one speed ratio in the reverse direction, said speed change unit including individual hydraulic piston-cylinder actuators for effecting the setting to each speed ratio; a hydraulic fluid sump; a pump continuously driven by said prime mover with inlet drawing fluid from the sump and an outlet; a first valve adapted to connect the hereinafter named direction control valve to the pump outlet at an on position and at an off position to the sump; means connected with the power controls and said valve whereby the valve is set to an off and on position when the power controls are set for a non-driving and driving condition of the prime mover; a driving direction control valve receiving fluid from the first valve adapted at a neutral setting to direct fluid to the sump, at reverse setting to the actuator effecting the reverse speed setting, and at a forward speed setting to the hereinafter named speed responsive valve means; and speed responsive valve means including a movable valve element determining at various settings the flow of fluid from the direction control valve to the actuators effecting forward speed ratio settings, and governor type centrifugal means driven by said output shaft and coupled to said valve element for positioning said valve element in response to output shaft speed.

12. A system as described in claim 11 wherein said means connected with the power controls comprises a switch mechanically linked to a power control setting element of the prime mover to close when said controls are set for a driving condition and open when set for non-driving condition, solenoid power means for moving said first valve to on and off positions, and a source of electric power electrically connected in series circuit relation.

13. A system as described in claim 12, wherein there is provided an independent control switch in parallel with the said switch, whereby said first valve may be set to an on position independently of the setting of said power controls.

14. A gear change unit wherein all gear elements are in constant mesh comprising: a housing, an input shaft journalled in the housing having a gear formation thereon; a countershaft mounted in said housing having a plurality of gear formations thereon with a first formation in constant mesh with the gear formation of the input shaft; a splined output shaft journalled in the housing; a plurality of gear members rotatably mounted on the output shaft as parts of corresponding constantly meshed gear trains each including a corresponding countershaft gear formation; a plurality of ball clutch units, each including a driven element splined to the output shaft, a driving element co-axial to the output shaft, a plurality of balls, one of said clutch elements having a cylindrical flange provided with a circumferentially spaced series of radial apertures to serve as a ball carrier and the other element having radially adjacent to one side of said flange a cylindrical surface provided with a circumferentially spaced series of recesses corresponding in number to said apertures, and an axially shiftable clutch actuating plunger having a circumferential ball camming surface disposed on the other side of said flange to cam said balls into engagement with said recesses for locking the driving and driven clutch elements in clutch engaged relation at one axial position and to release the balls at a clutch disengaged position; one of the ball clutches having a driving element secured to the input shaft as a direct speed clutch and the other clutches having driving elements secured to corresponding gear members; and actuating means for the ball clutches including shipper means to move the clutch operating plungers singly and selectively into engaged position.

15. A device as described in claim 14, wherein said actuating means includes a hydraulic cylinder unit to operate said shipper means.

16. A device as described in claim 14 wherein said ball clutch includes compression spring means biasing said plunger toward disengaged position.

17. A gear change unit wherein all gear elements are in constant mesh comprising: a housing, an input shaft journalled in the housing having a gear formation thereon; a countershaft mounted in said housing having a plurality of gear formations thereon with a first formation in constant mesh with the gear formation of the input shaft; a splined output shaft journalled in the housing; a plurality of gear members rotatably mounted on the output shaft as parts of corresponding constantly meshed gear trains each including a corresponding countershaft gear formation, at least one of said trains including an additional gear as a reverse train; a plurality of ball clutch units, each including a driven element splined to the output shaft, a driving element co-axial to the output shaft, a plurality of balls, one of said clutch elements having a cylindrical flange provided with a circumferentially spaced series of radial apertures to serve as a ball carrier and the other element having radially adjacent to one side of said flange a cylindrical surface provided with a circumferentially spaced series of recesses corresponding in number to said apertures, an axially shiftable clutch actuating plunger having a circumferential ball camming surface disposed on the other side of said flange to cam said balls into engagement with said recesses for locking the driving and driven clutch elements in clutch engaged relation at one axial position and to release the balls at a clutch disengaged position, and resilient means biasing the plunger to disengaged position; one of the ball clutches having a driving element secured to the input shaft as a direct speed clutch and the other clutches having driving elements secured to corresponding gear members; and actuating means for the ball clutches including shipper means to move the clutch operating plungers singly and selectively into engaged position.

18. A device as described in claim 17, wherein said actuating means includes a hydraulic cylinder unit to operate said shipper means.

19. A device as described in claim 17 wherein the ball clutches are disposed with the plungers thereof in axially opposed paired relation beginning with the highest speed ball clutch, any odd lowest speed ball clutch having its plunger in like opposed relation with that of the reverse speed ball clutch.

20. A gear change unit wherein all gear elements are in constant mesh comprising: a housing, an input shaft journalled in the housing having a gear formation thereon; a countershaft mounted in said housing having a plurality of gear formations thereon with a first formation in constant mesh with the gear formation of the input shaft; a splined output shaft journalled in the housing; a plurality of gear members rotatably mounted on the output shaft as parts of corresponding constantly meshed gear trains each including a corresponding countershaft gear formation, at least one of said trains including an additional gear as a reverse train; a plurality of ball clutch units, each including an annularly flanged driven element splined to the output shaft, a driving element co-axial to the output shaft having an annular flange about the flange of the driven element, a plurality of balls, said driven clutch element having the annular flange provided with a circumferentially spaced series of radial apertures to serve as a ball carrier, and the driving element having the inner surface of its flange provided with a circumferentially spaced series of recesses corresponding in number to said apertures, and an axially shiftable clutch actuating plunger having a circumferential ball camming surface disposed within the driven element flange to cam said balls into engagement with said recesses for locking the driving and driven clutch elements in clutch engaged relation at one axial position and to release the balls at a clutch disengaged position; one of the ball clutches having a driving element secured to the input shaft as a direct speed clutch and the outer clutches having driving elements secured to corresponding gear members; and actuating means for each said ball clutch including shipper means to move the clutch operating plunger into engaged position.

21. A gear change unit as described in claim 20 wherein said actuating means includes a hydraulic cylinder unit to operate said shipper means.

22. A gear change unit as described in claim 20 wherein said actuating means includes a hydraulic cylinder unit to operate said shipper means in moving the ball clutch plunger into engaged position, and opposed compression spring means for moving the plunger toward disengaged position upon release of the force applied by said hydraulic cylinder unit.

23. For connecting the crankshaft or the like of a prime mover to an output shaft, an automatic hydraulic transmission system comprising: a fluid coupling unit having a fluid tight housing driven by said crankshaft, impeller means secured to the housing, rotor means including a driven shaft, and a hydraulically engaged coupling clutch within the housing including a driving clutch member driven by said crankshaft, a driven clutch member secured to the coupling driven shaft to rotate therewith, and hydraulic cylinder and piston means to engage said coupling clutch members; a gear change unit including a housing, an input gear member journalled in the housing and driven by said driven shaft, a countershaft mounted in said housing having a plurality of gear formations thereon with a first formation in constant mesh with said input gear member, a splined output shaft journalled in said housing, at least one gear member rotatably mounted on the output shaft as part of a constantly meshed gear train including a second of said gear formations, a plurality of ball clutch units, each clutch unit having a corresponding driven element splined to the output shaft and a driving element and a plurality of clutch balls and an axially shiftable clutch actuating plunger cylinder, one of said clutch elements having a cylindrical flange provided with a circumferentially spaced series of radial apertures serving as a ball carrier and the other element having radially adjacent to one side of said flange a cylindrical surface provided with at least one circumferentially spaced series of recesses corresponding in number to said apertures, said plunger having a circumferential ball camming surface disposed on the other side of said flange to cam said balls into locking engagement with said recesses for clutch engagement at one axial position and release the balls for clutch disengagement at a second position, the driving element of one of the ball clutches being fixed to said input gear element to provide a direct speed clutch and the driving element of a second one of the ball clutches being fixed to said gear member to provide a clutch for another speed; actuating means for each ball clutch including a hydraulic piston-cylinder unit, means for applying the force of the piston-cylinder unit to the plunger of the corresponding ball clutch for moving the plunger to engaged position; a hydraulic fluid sump and a continuously driven pump drawing fluid from said sump; speed responsive valve means coupled to said output shaft and responsive to the speed thereof whereby fluid from said pump may be applied successively and individually to the ball clutches for forward driving from the lowest speed to highest speed clutch of the gear unit and finally to the coupling clutch while the highest speed ball clutch is engaged as the output shaft attains predetermined successively higher speeds; said speed responsive means including a movable valve element determining at distinct settings the flow of fluid from the pump to the hydraulic units of the ball clutches and to the hydraulic means actuating the coupling clutch, and also including a governor type centrifugal device driven by said output shaft and coupled to the movable valve element for positioning the latter in response to output shaft speed.

24. A transmission as described in claim 23 wherein the gear change unit includes two forward speed ball clutches and said movable valve element controls directly the fluid to the ball clutch actuating units.

25. A transmission as described in claim 24 wherein the fluid to the hydraulic actuating means of the coupling clutch is controlled directly by a relay valve, and the fluid for actuating the relay valve is controlled by said valve element.

26. A transmission as described in claim 23 wherein the gear change unit includes at least three forward speed ball clutches and said speed responsive valve means includes a multiplex relay valve having a plurality of hydraulically set valve pistons directly controlling the flow of fluid to the hydraulic units actuating the forward speed ball clutches, and said valve element directly controls the application of fluid to set the said valve pistons.

27. A transmission as described in claim 26 wherein the fluid to the hydraulic actuating means of the coupling clutch is controlled directly by a relay valve and the fluid for actuating the last named relay valve is controlled directly by said moveable valve element.

28. A transmission as described in claim 23 wherein said coupling clutch includes a clutch drum secured within said housing, co-axially to said driven shaft, a clutch hub carrying said rotor and secured to the driven shaft, the clutch hub being provided with circumferentially spaced radial bores, piston members received in said bores as cylinders, and carrying segmental shoes for engagement with said drum, said driven shaft and hub being provided with fluid passageways whereby hydraulic fluid may be introduced into said hub bores as actuating fluid for said clutch.

29. An automatic transmission as described in claim 23, wherein said coupling clutch includes a clutch plate secured against rotation relative to the driven shaft, a second clutch plate driven by the housing, a hydraulic piston-cylinder assembly disposed about said driven shaft and adapted to apply pressure to said clutch members upon admission of hydraulic pressure thereto, and a channel system in said output shaft for introducing fluid to said assembly.

30. An automatic hydraulically operated transmission for connecting an engine to an output shaft comprising: a fluid coupling with impeller driven by the engine and a rotor; a gear change unit with an input shaft driven by said rotor, an output shaft, gearing means providing a plurality of power transmission paths from the input to output shaft wherein the gears are in constant mesh, and ball clutches interposed between the output shaft and the last gear of each said path, each said ball clutch having an axially shiftable member for camming the balls of the clutch into engaged position; clutch operating means including hydraulic cylinder units for shifting the said members into clutch engaged positions; a hydraulically powered gear change operating system, including a pump constantly driven by the engine, a valve controlled by the power control means of the engine for admitting fluid from the pump to the rest of the system when the engine controls are set for a driving condition, a driving direction control valve for admitting fluid from the first valve selectively to the hydraulic cylinder unit engaging the ball clutch associated with one of said paths, to the hydraulic cylinder units engaging the ball clutches associated with the other said paths, and to a exhaust; and speed responsive valve means including a mechanical device driven by the said output shaft for setting the valve means in response to output shaft speed; said valve means being adapted at successively higher speed settings to direct the flow of fluid to the hydraulic units of the ball clutches controlling the successively higher speed power transmission paths among said other power paths.

31. A transmission as described in claim 30 wherein said clutch operating means includes shipper means comprising a grooved ring slidably mounted on the output shaft for moving the axially shiftable member of the clutch, a rocker shaft mounted transversely to the output shaft and carrying rocker arm means engaged wth said grooved ring, a lever means secured to the rocker shaft for rotating the same including a lever arm movable by the hydraulic cylinder unit, and a restoring spring bearing upon said lever means in opposition to the force applied by the hydraulic unit.

32. A transmission as described in claim 31 wherein at least some of said clutches are grouped in paired relation with the axially movable members of the paired clutch in opposed relation and with a shipper ring disposed therebetween, and wherein the hydraulic cylinder units of the paired clutches move said lever arm in opposite directions for alternate engagement of the paired clutches.

References Cited in the file of this patent

UNITED STATES PATENTS

| | | |
|---|---|---|
| 1,979,488 | Perez | Nov. 6, 1934 |
| 2,104,608 | Cox et al. | Jan. 4, 1938 |
| 2,279,019 | Black | Apr. 7, 1942 |
| 2,313,645 | Jandasek | Mar. 9, 1943 |
| 2,351,483 | Carnagua | June 13, 1944 |
| 2,619,848 | Carnagua | Dec. 2, 1952 |
| 2,627,190 | McFarland | Feb. 3, 1953 |
| 2,640,373 | Jandasek | June 2, 1953 |
| 2,667,085 | Ackerman | Jan 26, 1954 |
| 2,693,711 | Kelbel et al. | Nov. 9, 1954 |